(12) United States Patent
Kitasei

(10) Patent No.: US 12,541,101 B2
(45) Date of Patent: Feb. 3, 2026

(54) APPARATUS WEARABLE IN SUCH A WAY AS TO COVER USER'S VIEW, CONTROL METHOD, AND STORAGE MEDIUM

(71) Applicant: CANON KABUSHIKI KAISHA, Tokyo (JP)

(72) Inventor: Yuma Kitasei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/623,378

(22) Filed: Apr. 1, 2024

(65) Prior Publication Data

US 2024/0337833 A1 Oct. 10, 2024

(30) Foreign Application Priority Data

Apr. 10, 2023 (JP) ................. 2023-063537

(51) Int. Cl.
*G09G 5/00* (2006.01)
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0141* (2013.01)

(58) Field of Classification Search
CPC ............ G02B 27/0093; G02B 27/0172; G02B 2027/0141

USPC .............................................. 345/8
See application file for complete search history.

(56) References Cited

U.S. PATENT DOCUMENTS

| 2017/0168297 | A1 | 6/2017 | Morimoto |
| 2017/0262046 | A1* | 9/2017 | Clement ............. G02B 27/017 |
| 2018/0276891 | A1* | 9/2018 | Craner ..................... G08B 7/06 |
| 2018/0311515 | A1* | 11/2018 | Wilson ................. A61B 5/6803 |
| 2020/0167003 | A1* | 5/2020 | Nonomura ......... G02B 27/0172 |
| 2023/0398435 | A1* | 12/2023 | Dorn ....................... G06F 3/165 |

FOREIGN PATENT DOCUMENTS

| JP | 6539351 B2 | 7/2019 |
| JP | 2022022223 A | 2/2022 |

* cited by examiner

*Primary Examiner* — Jonathan M Blancha
(74) *Attorney, Agent, or Firm* — Canon U.S.A., Inc. IP Division

(57) ABSTRACT

A wearable apparatus covers a user's view includes a processor and a memory coupled to the processor and storing instructions that, when executed by the processor, cause the processor to function as an acquisition unit configured to acquire a result obtained by detecting a person adjacent to the user, and a warning unit configured to provide a warning to at least the adjacent person based on a distance between a virtual boundary line representing a moving range of the user wearing the apparatus and the adjacent person.

10 Claims, 17 Drawing Sheets

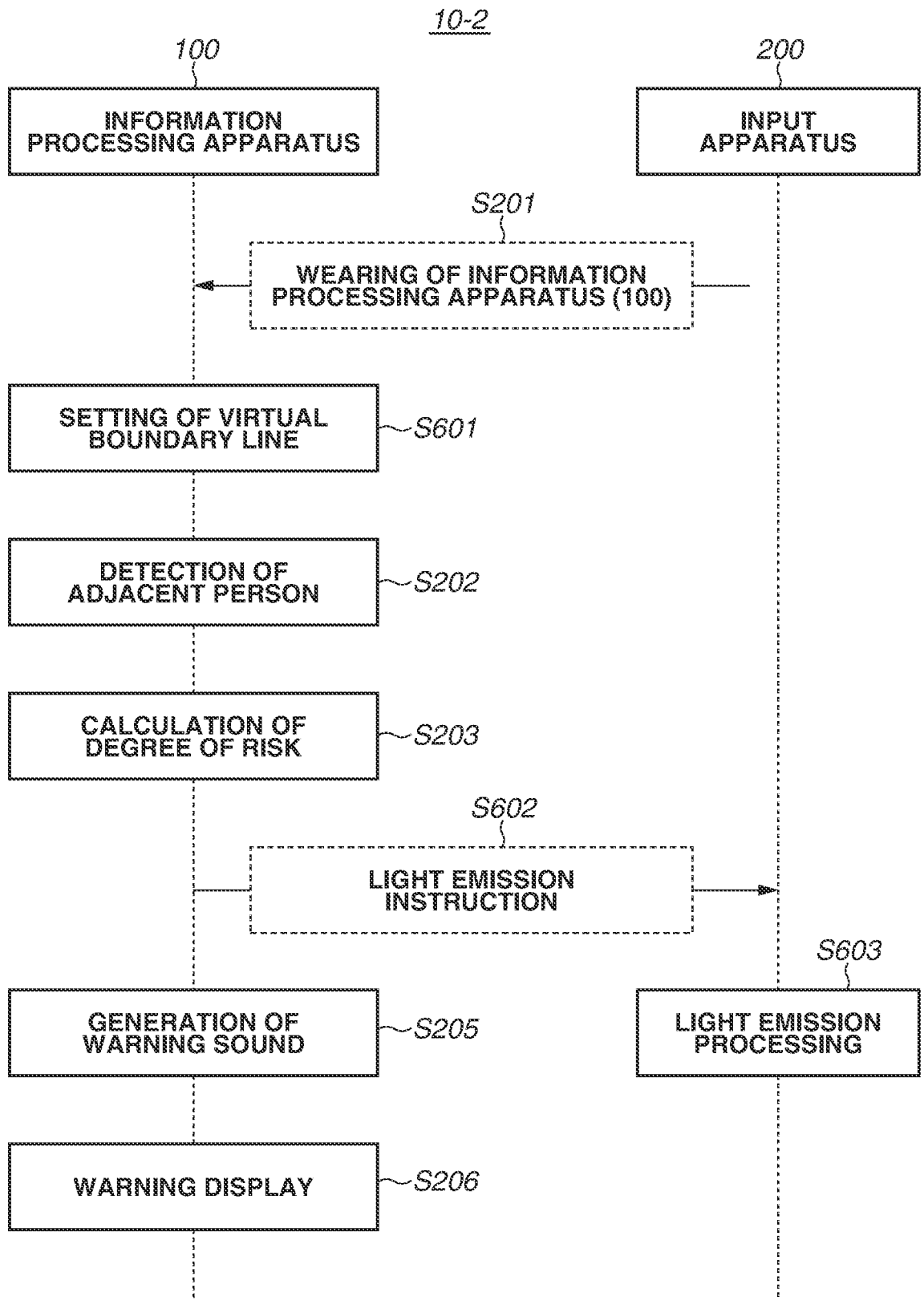

APPARATUS WEARABLE IN SUCH A WAY AS TO COVER USER'S VIEW, CONTROL METHOD, AND STORAGE MEDIUM

BACKGROUND

Technical Field

Aspects of the present disclosure generally relate to an apparatus wearable in such a way as to cover a user's view, a control method, and a storage medium.

Description of the Related Art

If a user wears a head-mounted display, which is a type of wearable apparatus that cover a user's view, since the user is unable to view the surroundings of the user (since the head-mounted display is worn in such a way as to cover the view of the user), the user is at a risk of colliding with an obstacle. In this regard, Japanese Patent No. 6,539,351 discusses a technique which, if there is a possibility that a user wearing a head-mounted display collides with obstacle, displays a warning in the head-mounted display, thus calling attention to the user.

Moreover, Japanese Patent Application Laid-Open No. 2022-22223 discusses a technique which detects the behavior of a person other than a user wearing a head-mounted display and, if there is a possibility that the user is damaged, gives a warning to the user.

However, the technique discussed in each of Japanese Patent No. 6,539,351 and Japanese Patent Application Laid-Open No. 2022-22223 is a technique which gives a warning to a user wearing a head-mounted display and is not a technique which gives a warning to a person adjacent to the user. In this respect, the adjacent person is unable to know, for example, how much the user wearing a head-mounted display is recognizing the surroundings of the user or in what way the surroundings are viewed by the user wearing a head-mounted display. Therefore, the adjacent person is not able to determine, for example, how much the adjacent person should move away from the user wearing a head-mounted display or whether there is a risk for collision with the user wearing a head-mounted display.

SUMMARY

According to an aspect of the present disclosure, a wearable apparatus that covers a user's view includes a processor and a memory coupled to the processor and storing instructions that, when executed by the processor, cause the processor to function as an acquisition unit configured to acquire a result obtained by detecting a person adjacent to the user, and a warning unit configured to give a warning to at least the adjacent person based on a distance between a virtual boundary line representing a moving range of the user wearing the apparatus and the adjacent person.

Further features of the present disclosure will become apparent from the following description of exemplary embodiments with reference to the attached drawings.

BRIEF DESCRIPTION OF THE DRAWINGS

FIG. 6 is a sequence diagram illustrating an example of a processing procedure in a control method for the information processing apparatus and the input apparatus according to the second exemplary embodiment.

DESCRIPTION OF THE EMBODIMENTS

Various exemplary embodiments, features, and aspects of the disclosure will be described in detail below with reference to the drawings.

First, a first exemplary embodiment of the present disclosure is described.

The first exemplary embodiment is configured to calculate a degree of risk based on a distance between a user with an information processing system such as a head-mounted display worn in such a way as to cover the view thereof and a person adjacent to the user and gives a warning to the user and the adjacent person according to the calculated degree of risk. In this instance, while various methods are considered as a method for warning, in the first exemplary embodiment, methods of performing emission of color light, generation of warning sound, and warning display are described.

Figure 1:
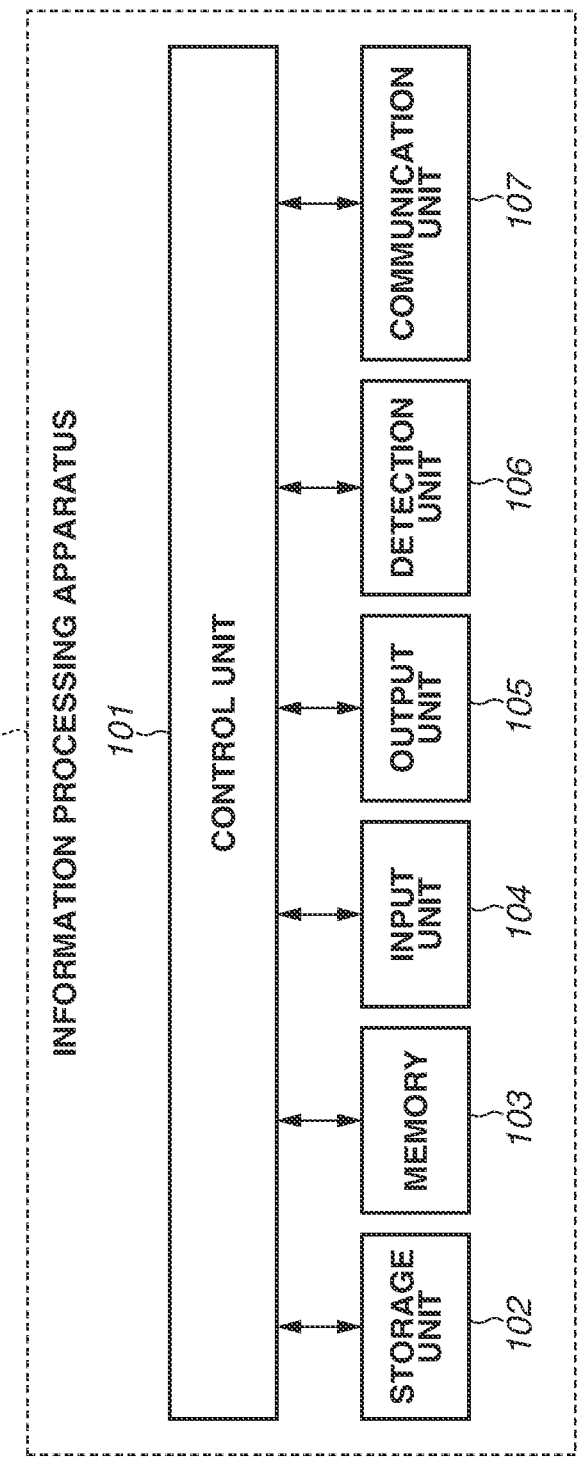
FIG. 1 is a diagram illustrating an example of an outline configuration of an information processing apparatus according to a first exemplary embodiment.

FIG. 1 is a diagram illustrating an example of an outline configuration of an information processing apparatus 100 according to the first exemplary embodiment.

In the description of the first exemplary embodiment, it is supposed that the information processing apparatus 100 is a head-mounted display wearable in such a way as to cover a user's view.

The information processing apparatus 100 includes, as illustrated in FIG. 1, a control unit 101, a storage unit 102, a memory 103, an input unit 104, an output unit 105, a detection unit 106, and a communication unit 107.

The control unit 101 controls the respective constituent units (102 to 107) of the information processing apparatus 100, thus comprehensively controlling operations of the information processing apparatus 100 and performing various processing operations. Furthermore, instead of the control unit 101 controlling the overall operation of the information processing apparatus 100, a plurality of hardware constituent units can share the processing operations to control the overall operation of the information processing apparatus 100.

The storage unit 102 is, for example, an electrically erasable and recordable non-volatile storage medium, such as a solid state drive (SSD) or a flash memory. The storage unit 102 preliminarily stores, for example, programs which are executed by the control unit 101, databases for various pieces of data, and user setting information. Moreover, the storage unit 102 stores various pieces of information and various pieces of data which have been obtained by control and processing operations performed by the control unit 101.

The memory 103 is, for example, a random access memory (RAM). The memory 103 is used as, for example, a buffer memory which temporarily stores various pieces of information and various pieces of data or a work area for the control unit 101.

The input unit 104 is used to input an instruction issued to the information processing apparatus 100 by the user. The input unit 104 includes, for example, a power button used for issuing an instruction for powering on or off the information processing apparatus 100, a screen transition operation button used for issuing an instruction for screen transition, and an action mode operation button for issuing an instruction for action mode of the information processing apparatus 100. Furthermore, the input unit 104 does not necessarily need to be built into the information processing apparatus 100.

The output unit 105 includes, for example, a graphical user interface (GUI) display device used for dialogic operation, a light emission device such as a light-emitting diode (LED), and a sound output device such as a loudspeaker. Furthermore, the output unit 105 does not necessarily need to be built into the information processing apparatus 100.

The detection unit 106 includes, for example, an image capturing sensor for capturing a surrounding video image and sensors such as a light detection and ranging (LiDAR) sensor and a time of flight (ToF) sensor for measuring the surroundings. Additionally, the detection unit 106 includes, for example, an inertial measurement unit (IMU) and a geomagnetic sensor for orientation and position measurement. Furthermore, the detection unit 106 does not necessarily need to be built into the information processing apparatus 100.

The communication unit 107 includes, for example, a network interface card (NIC) into which a connector (RJ45) and a communication integrated circuit (IC) for connection to Ethernet are built. Additionally, the communication unit 107 includes, for example, a communication unit for Wi-Fi or Bluetooth for performing wireless communication with an external apparatus including a controller. Furthermore, the communication unit 107 does not necessarily need to be built into the information processing apparatus 100.

Here, a method for calculating a degree of risk in the first exemplary embodiment is described.

In the first exemplary embodiment, the calculation method defines the possibility that a user wearing a head-mounted display, which is applied as the information processing apparatus 100, and a person adjacent to the user might collide with each other, as a degree of risk x in the following way.

In the first exemplary embodiment, the calculation method denotes a distance between the user and the adjacent person by $\alpha$ and defines the degree of risk x as $x=1/\alpha$. With regard to a calculation formula for the degree of risk x, since, if the distance between the user and the adjacent person becomes small and the value of the distance $\alpha$ becomes small, the possibility that the user and the adjacent person collide with each other increases, the value of the degree of risk X becomes large. Thus, in the first exemplary embodiment, as the distance $\alpha$ between the user and the adjacent person becomes smaller, the value of the degree of risk x becomes larger. Moreover, in a case where there is a plurality of (n) persons adjacent to the user, the calculation method calculates degrees of risk x1 to xn for the respective adjacent persons with use of the values of the distances $\alpha1$ to $\alpha n$ between the user and the respective adjacent persons. Furthermore, the calculation method for the degree of risk x described here is merely an example, and the definition and calculation formula for the degree of risk x can be replaced with different ones.

Next, a warning method for the user and the adjacent person in the first exemplary embodiment is described. In the first exemplary embodiment, the warning method sets a first threshold value t1 and a second threshold value t2 (t2>t1), which are two-staged threshold values, with respect to a degree of risk calculated based on a distance between a user wearing a head-mounted display, which is applied as the information processing apparatus 100, and a person adjacent to the user.

In the first exemplary embodiment, in a case where the degree of risk is less than the first threshold value t1, the warning method determines that the degree of risk for collision between the user and the adjacent person is low and, thus, the user and the adjacent person are under safe conditions. Then, in this case, to inform the adjacent person of such safe conditions, the warning method causes an LED mounted on the exterior of the head-mounted display, which is applied as the information processing apparatus 100, to emit blue light.

Moreover, in the first exemplary embodiment, in a case where the degree of risk is greater than or equal to the first threshold value t1 and less than the second threshold value t2, the warning method determines that the degree of risk for collision between the user and the adjacent person is medium and, thus, a condition requiring caution (warning) is occurring. Then, in this case, to inform the adjacent person of the requirement of caution, the warning method causes the LED mounted on the exterior of the head-mounted display, which is applied as the information processing apparatus 100, to emit yellow light, thus giving a warning to the adjacent person.

Moreover, in the first exemplary embodiment, in a case where the degree of risk is greater than or equal to the second threshold value t2, the warning method determines that the degree of risk for collision between the user and the adjacent person is high and, thus, a dangerous condition is occurring. Then, in this case, to inform the adjacent person of the dangerous condition, the warning method causes the LED mounted on the exterior of the head-mounted display, which is applied as the information processing apparatus 100, to emit red light, thus giving a warning to the adjacent person. Additionally, the warning method causes the loudspeaker to generate warning sound, thus giving a warning to the adjacent person and the user. Besides, the warning method displays, in the head-mounted display, which is applied as the information processing apparatus 100, a warning indicating that there is a possibility of colliding with the adjacent person, thus giving a warning to the user.

Moreover, in a case where there is a plurality of persons adjacent to the user, for example, the warning method gives a warning tailored to an adjacent person with the highest degree of risk x in the plurality of adjacent persons. Furthermore, the warning method for the user and the adjacent person described here is merely an example, and different other warning methods can also be employed.

Figure 2:
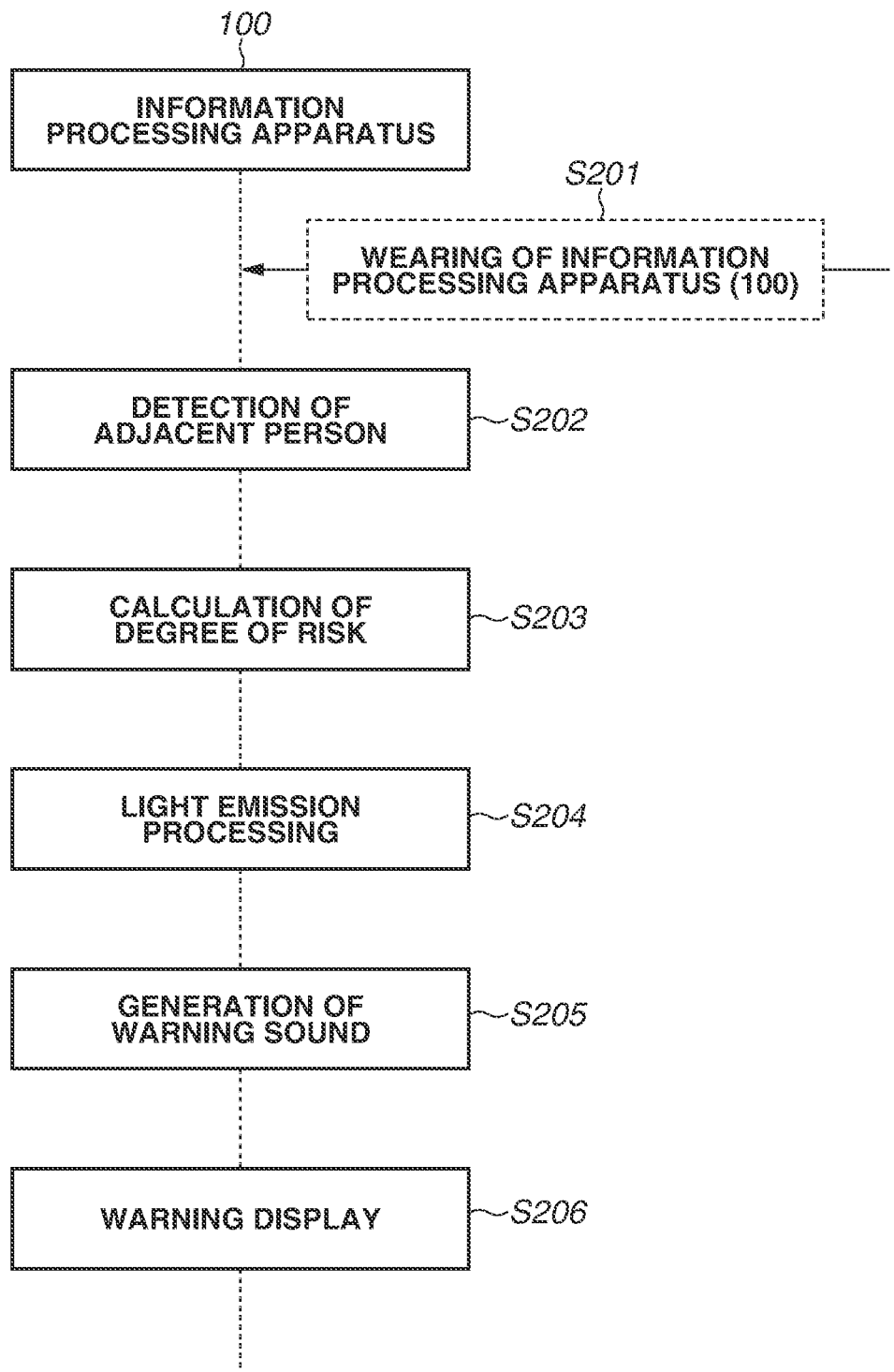
FIG. 2 is a sequence diagram illustrating an example of a processing procedure in a control method for the information processing apparatus according to the first exemplary embodiment.

FIG. 2 is a sequence diagram illustrating an example of a processing procedure in a control method for the information processing apparatus 100 according to the first exemplary embodiment. Specifically, FIG. 2 illustrates the flow of processing which the information processing apparatus 100 performs in a case where, while a user wears a head-mounted display, which is applied as the information processing apparatus 100, a person adjacent to the user has come close to the user.

When the processing illustrated in the sequence diagram of FIG. 2 is started, first, in step S201, the user wears the information processing apparatus 100 in such a manner that the information processing apparatus 100 covers the view of the user.

Next, in step S202, the control unit 101 of the information processing apparatus 100 measures, via the detection unit 106, the condition of the surroundings of the information processing apparatus 100 (the surroundings of the user) and thus performs processing for detecting an adjacent person.

Next, in step S203, the control unit 101 of the information processing apparatus 100 calculates, by computation, a degree of risk with respect to the adjacent person detected in step S202. Here, in the first exemplary embodiment, as mentioned above, the control unit 101 denotes the distance between the user and the adjacent person by α and calculates the degree of risk x as x=1/α.

Next, in step S204, the control unit 101 of the information processing apparatus 100 performs light emission processing via the output unit 105 according to the degree of risk detected in step S203.

Next, in step S205, the control unit 101 of the information processing apparatus 100 performs generation of warning sound via the output unit 105 according to the degree of risk detected in step S203.

Next, in step S206, the control unit 101 of the information processing apparatus 100 performs warning display in the information processing apparatus 100 (head-mounted display (HMD)) via the output unit 105 according to the degree of risk detected in step S203.

Next, the details of a processing procedure in a control method for the information processing apparatus 100 which is performed to implement the sequence diagram illustrated in FIG. 2 are described with reference to FIG. 3.

Figure 3:
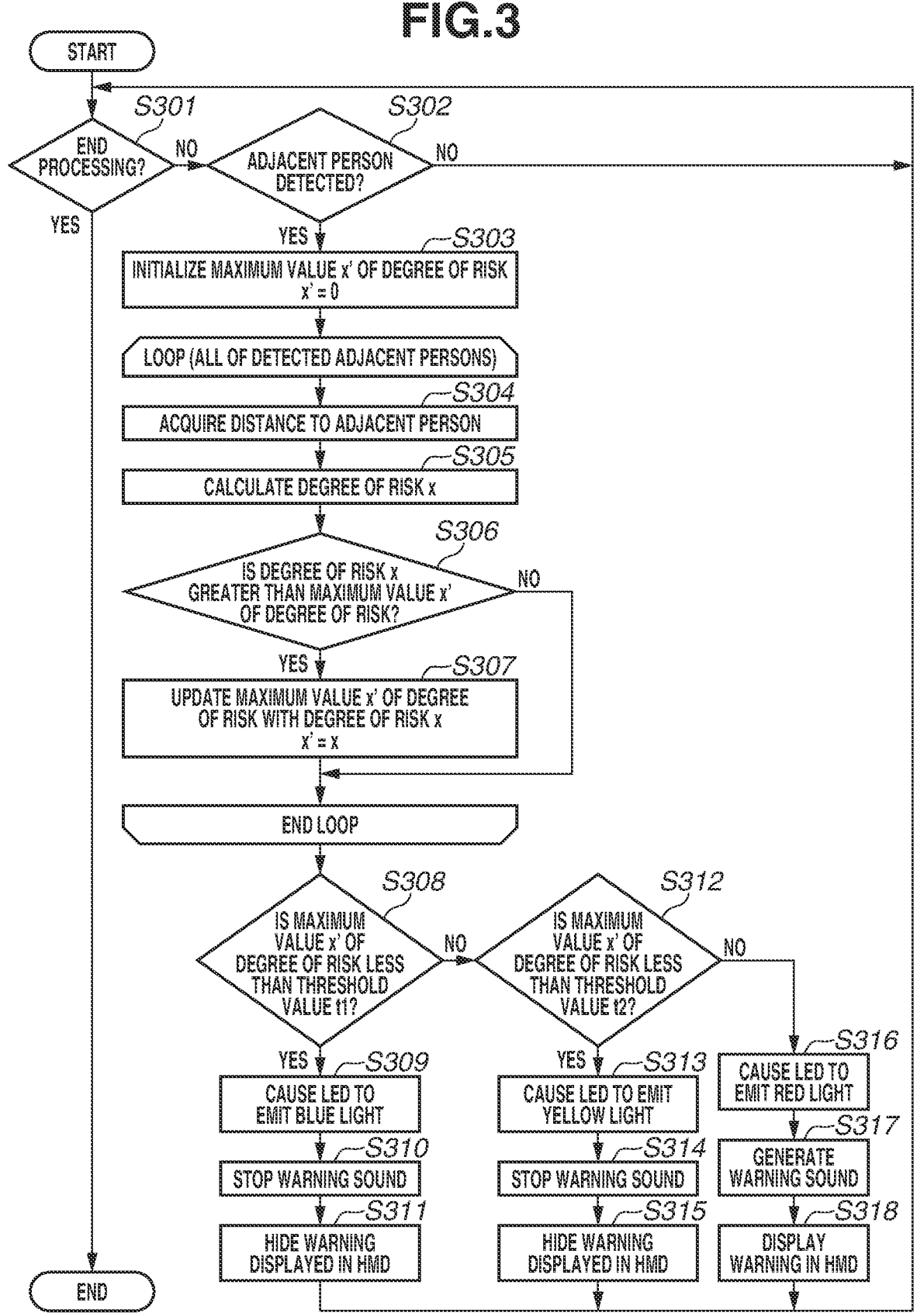
FIG. 3 is a flowchart illustrating an example of a processing procedure in a control method for the information processing apparatus according to the first exemplary embodiment.

FIG. 3 is a flowchart illustrating an example of a processing procedure in a control method for the information processing apparatus 100 according to the first exemplary embodiment. The processing illustrated in the flowchart of FIG. 3 is started in response to the user wearing the information processing apparatus 100 in such a manner that the information processing apparatus 100 covers the view of the user and the information processing apparatus 100 being started up.

When the processing illustrated in the flowchart of FIG. 3 is started, first, in step S301, the control unit 101 of the information processing apparatus 100 determines whether to end the processing, based on the states of the respective constituent units of the information processing apparatus 100. For example, in a case where a stopping operation has been performed via the input unit 104 or in a case where it has been detected via the detection unit 106 that the user has removed the information processing apparatus 100, the control unit 101 determines to end the processing.

If, in step S301, it is determined not to end the processing (it is determined to continue the processing) (NO in step S301), the control unit 101 advances the processing to step S302.

In step S302, the control unit 101 determines whether an adjacent person has been able to be detected via the detection unit 106. This processing operation in step S302 is equivalent to the processing operation in step S202 illustrated in FIG. 2. If, in step S302, it is determined that no adjacent person has been able to be detected (NO in step S302), the control unit 101 returns the processing to step S301.

Moreover, if, in step S302, it is determined that an adjacent person has been able to be detected (YES in step S302), the control unit 101 advances the processing to step S303.

In step S303, the control unit 101 initializes the value of the maximum value x' of the degree of risk (x'=0).

Next, in step S304, the control unit 101 acquires a distance between the user wearing the information processing apparatus 100 (alternatively, the information processing apparatus 100) and the adjacent person detected in step S302.

Next, in step S305, the control unit 101 calculates, by computation, the value of the degree of risk x based on the distance between the user (alternatively, the information processing apparatus 100) and the adjacent person acquired in step S304.

Next, in step S306, the control unit 101 determines whether the value of the degree of risk x calculated in step S305 is greater than the maximum value x' of the degree of risk.

If, in step S306, it is determined that the value of the degree of risk x calculated in step S305 is greater than the maximum value x' of the degree of risk (YES in step S306), the control unit 101 advances the processing to step S307.

In step S307, the control unit 101 updates the maximum value x' of the degree of risk with the value of the degree of risk x calculated in step S305 (x'=x).

Moreover, if, in step S306, it is determined that the value of the degree of risk x calculated in step S305 is not greater than the maximum value x' of the degree of risk (NO in step S306), the control unit 101 advances the processing to the next step.

Here, the above-mentioned processing operations in step S304 to step S307 are performed with respect to all of the adjacent persons detected in step S302. Thus, the above-mentioned processing operations in step S304 to step S307 are repeatedly performed by the number of all of the adjacent persons detected in step S302. Moreover, the above-mentioned processing operations in step S303 to step S307 are equivalent to the processing operation in step S203 illustrated in FIG. 2.

Next, in step S308, the control unit 101 determines whether the maximum value x' of the degree of risk is less than the first threshold value (less than the first threshold value t1).

If, in step S308, it is determined that the maximum value x' of the degree of risk is less than the first threshold value t1 (YES in step S308), the control unit 101 advances the processing to step S309.

In step S309, the control unit 101 causes, via the output unit 105, the LED mounted on the information processing apparatus 100 to emit blue light. This processing operation in step S309 is equivalent to the processing operation in step S204 illustrated in FIG. 2.

Next, in step S310, in a case where warning sound is being generated from the loudspeaker mounted on the information processing apparatus 100 via the output unit 105, the control unit 101 stops the warning sound.

Moreover, in a case where warning sound is not being generated from the loudspeaker, the control unit 101 performs processing for maintaining this condition.

Next, in step S311, in a case where a warning is being displayed on the display mounted inside the information processing apparatus 100 via the output unit 105, the control unit 101 hides the warning. Moreover, in a case where no warning is being displayed on the display, the control unit 101 performs processing for maintaining this condition. Then, after the processing operation in step S311 ends, the control unit 101 returns the processing to step S301.

Moreover, if, in step S308, it is determined that the maximum value x' of the degree of risk is not less than the first threshold value t1 (is greater than or equal to the first threshold value) (NO in step S308), the control unit 101 advances the processing to step S312.

In step S312, the control unit 101 determines whether the maximum value x' of the degree of risk is less than the second threshold value (less than the second threshold value t2), which is greater than the first threshold value t1.

If, in step S312, it is determined that the maximum value x' of the degree of risk is less than the second threshold value t2 (YES in step S312), the control unit 101 advances the processing to step S313. Furthermore, the case where the control unit 101 advances the processing to step S313 occurs in a case where the maximum value x' of the degree of risk is greater than or equal to the first threshold value (greater than or equal to the first threshold value t1) and less than the second threshold value (less than the second threshold value t2).

In step S313, the control unit 101 causes, via the output unit 105, the LED mounted on the information processing apparatus 100 to emit yellow light, thus giving a warning to the adjacent person. This processing operation in step S313 is equivalent to the processing operation in step S204 illustrated in FIG. 2.

Next, in step S314, in a case where warning sound is being generated from the loudspeaker mounted on the information processing apparatus 100 via the output unit 105, the control unit 101 stops the warning sound.

Moreover, in a case where warning sound is not being generated from the loudspeaker, the control unit 101 performs processing for maintaining this condition.

Next, in step S315, in a case where a warning is being displayed on the display mounted inside the information processing apparatus 100 via the output unit 105, the control unit 101 hides the warning. Moreover, in a case where no warning is being displayed on the display, the control unit 101 performs processing for maintaining this condition. Then, after the processing operation in step S315 ends, the control unit 101 returns the processing to step S301.

Moreover, if, in step S312, it is determined that the maximum value x' of the degree of risk is not less than the second threshold value t2 (is greater than or equal to the second threshold value) (NO in step S312), the control unit 101 advances the processing to step S316.

In step S316, the control unit 101 causes, via the output unit 105, the LED mounted on the information processing apparatus 100 to emit red light, thus giving a warning to the adjacent person. This processing operation in step S316 is equivalent to the processing operation in step S204 illustrated in FIG. 2.

Next, in step S317, the control unit 101 causes, via the output unit 105, the loudspeaker mounted on the information processing apparatus 100 to generate warning sound, thus giving a warning to the adjacent person (additionally, to the user wearing the information processing apparatus 100). This processing operation in step S317 is equivalent to the processing operation in step S205 illustrated in FIG. 2.

Next, in step S318, the control unit 101 performs warning display on the display mounted inside the information processing apparatus 100 via the output unit 105, thus giving a warning to the user wearing the information processing apparatus 100. This processing operation in step S318 is equivalent to the processing operation in step S206 illustrated in FIG. 2. Then, after the processing operation in step S318 ends, the control unit 101 returns the processing to step S301.

Moreover, if, in step S301, it is determined to end the processing (YES in step S301), the control unit 101 ends the processing illustrated in the flowchart of FIG. 3.

In the above-described information processing apparatus 100 according to the first exemplary embodiment, the control unit 101 performs processing for acquiring a result obtained by detecting a person adjacent to the user wearing the information processing apparatus 100 in such a manner that the information processing apparatus 100 covers the view of the user (step S202 or S302). The control unit 101, which performs this acquisition processing, is equivalent to an acquisition unit. Then, in the first exemplary embodiment, based on the distance between the user wearing the information processing apparatus 100 and a person adjacent to the user, the control unit 101 gives a warning to at least the adjacent person (steps S304, S313, and S316 to S318). The control unit 101, which performs this warning, is equivalent to a warning unit.

According to the information processing apparatus 100 in the first exemplary embodiment, since it is possible to give a warning to a person adjacent to a user wearing the information processing apparatus 100 in such a manner that the information processing apparatus 100 covers the view of the user, it is possible to reduce a risk for collision between the user and the adjacent person.

Specifically, in a case where the degree of risk, which becomes larger as the distance between a user and a person adjacent to the user becomes smaller, is greater than or equal to a predetermined threshold value (greater than or equal to the second threshold value t2), the control unit 101 gives a warning to the user and the adjacent person (steps S316 to S318).

Moreover, in a case where the degree of risk, which becomes larger as the distance between a user and a person adjacent to the user becomes smaller, is greater than or equal to the first threshold value t1 and less than the second threshold value t2, the control unit 101 gives a warning to the adjacent person (step S313).

According to this configuration, in a case where the degree of risk is medium, while the control unit 101 gives a warning only to the adjacent person, if the adjacent person avoids such a risky environment, the user is also able to avoid the risky environment without being given a warning. Then, it is possible to obtain such an advantageous effect that the user can be protected from losing a sense of immersion obtained at the time of use of the head-mounted display, which is applied as the information processing apparatus 100.

Moreover, depending on a case where the degree of risk is less than the first threshold value t1, a case where the degree of risk is greater than or equal to the first threshold value t1 and less than the second threshold value t2, and a case where the degree of risk is greater than or equal to the second threshold value t2, the control unit 101 performs control for emitting different color light to the adjacent person (steps S309, S313, and S316). The control unit 101, which performs this control for emitting different color light, is equivalent to a light emission control unit.

Next, a second exemplary embodiment of the present disclosure is described. Furthermore, in the following description of the second exemplary embodiment, items common to those in the above-described first exemplary embodiment are omitted from description, and items different from those in the above-described first exemplary embodiment are described.

The above-described first exemplary embodiment has a configuration which calculates, by computation, a degree of risk based on the distance between the user wearing the information processing apparatus 100 (alternatively, the information processing apparatus 100) and the adjacent person. The second exemplary embodiment has a configuration which sets a virtual boundary line representing a moving range of the user wearing the information processing apparatus 100 and calculates, by computation, a degree of risk based on the distance between the virtual boundary line and the adjacent person.

Moreover, in a case where the user is using the information processing apparatus 100 (head-mounted display) in see-through mode which enables the user to view the user's surroundings through the information processing apparatus 100, since the user is able to confirm the surroundings, it is considered that the risk for collision with the adjacent person is low. Therefore, the second exemplary embodiment is configured to calculate the degree of risk in consideration of whether the user is using the see-through mode.

Figure 4:
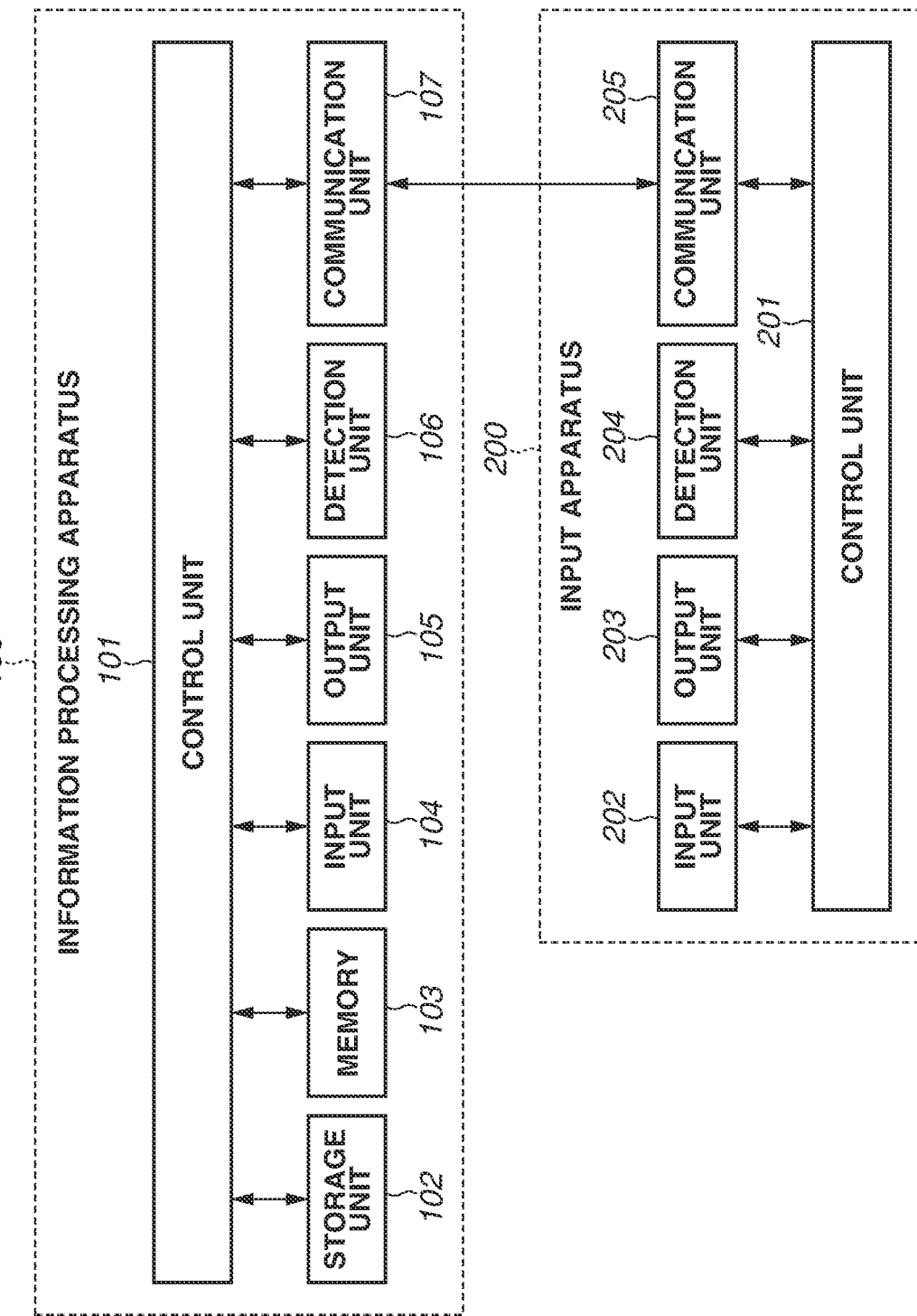
FIG. 4 is a diagram illustrating an example of an outline configuration of an information processing system according to a second exemplary embodiment.

FIG. 4 is a diagram illustrating an example of an outline configuration of an information processing system 10-2 according to the second exemplary embodiment. The information processing system 10-2 includes, as illustrated in FIG. 4, an information processing apparatus 100 and an input apparatus 200. In the description of the second exemplary embodiment, it is supposed that the information processing apparatus 100 is a head-mounted display wearable in such a way as to cover a user's view and the input apparatus 200 is a controller which the user operates. Furthermore, in FIG. 4, constituent components similar to those illustrated in FIG. 1 are assigned the respective same reference characters as those illustrated in FIG. 1, and the detailed description thereof is omitted. Thus, the outline configuration of the information processing apparatus 100 according to the second exemplary embodiment illustrated in FIG. 4 is similar to the outline configuration of the information processing apparatus 100 according to the first exemplary embodiment illustrated in FIG. 1.

The input apparatus 200 includes, as illustrated in FIG. 4, a control unit 201, an input unit 202, an output unit 203, a detection unit 204, and a communication unit 205.

The control unit 201 controls the respective constituent units (202 to 205) of the input apparatus 200, thus comprehensively controlling operations of the input apparatus 200 and performing various processing operations. Furthermore, instead of the control unit 201 controlling the overall operation of the input apparatus 200, a plurality of hardware constituent units can share the processing operations to control the overall operation of the input apparatus 200.

The input unit 202 is used to input instructions issued to the information processing apparatus 100 and the input apparatus 200 by the user. The input unit 202 includes, for example, a power button used for issuing an instruction for powering on or off the input apparatus 200, operation buttons for issuing an instruction for operating the information processing apparatus 100 (including an action mode operation button for issuing an instruction for action mode), and a joystick.

The output unit 203 includes, for example, a light emission device such as a light-emitting diode (LED) for giving feedback to the user, a sound output device such as a loudspeaker, and a vibration generation device such as a motor.

The detection unit 204 includes, for example, an inertial measurement unit (IMU) and a geomagnetic sensor for orientation and position measurement. Furthermore, the detection unit 204 does not necessarily need to be built into the input apparatus 200.

The communication unit 205 includes, for example, a communication unit for Wi-Fi or Bluetooth for performing wireless communication with the information processing apparatus 100 and another input apparatus (another controller).

Figure 5:
FIG. 5 is a diagram illustrating an example of a communication connection form for an information processing apparatus and an input apparatus according to the second exemplary embodiment.

FIG. 5 is a diagram illustrating an example of a communication connection form for the information processing apparatus 100 and the input apparatus 200 according to the second exemplary embodiment. In FIG. 5, constituent components similar to the constituent components illustrated in FIG. 4 are assigned the respective same reference characters as those illustrated in FIG. 4, and the detailed description thereof is omitted.

As illustrated in FIG. 5, the information processing apparatus 100 and the input apparatus 200 are connected for communication to each other via proximity wireless such as Bluetooth. In this case, input information caused by button pressing or joystick operation in the input apparatus 200 (input information generated by the input unit 202) is transmitted from the input apparatus 200 to the information processing apparatus 100 via the communication unit 205 and the communication unit 107. Moreover, to control the output unit 203 (such as an LED or a loudspeaker) mounted in the input apparatus 200, an instruction can be transmitted from the information processing apparatus 100 to the input apparatus 200 via the communication unit 107 and the communication unit 205. Furthermore, the communication connection form illustrated in FIG. 5 is merely an example, and the communication connection method and the communication connection configuration can be replaced with different ones.

Here, a method for calculating a degree of risk in the second exemplary embodiment is described.

In the second exemplary embodiment, the calculation method defines the possibility that a user wearing a head-mounted display, which is applied as the information processing apparatus 100, and a person adjacent to the user might collide with each other, as a degree of risk x in the following way.

In the second exemplary embodiment, the calculation method preliminarily sets a moving range of the user wearing the information processing apparatus 100, as a virtual boundary line, and denotes the distance between the virtual boundary line and the adjacent person by $\alpha$. Then, in the second exemplary embodiment, the calculation method uses the distance $\alpha$ to define the degree of risk x as $x=1/\alpha$. With regard to a calculation formula for the degree of risk x, since, if the adjacent person comes close to the virtual boundary line, which is based on the moving range of the user, and the value of the distance $\alpha$ becomes small, the possibility that the user and the adjacent person collide with each other increases, the value of the degree of risk X becomes large. Thus, in the second exemplary embodiment, as the distance $\alpha$ between the virtual boundary line and the adjacent person becomes smaller, the value of the degree of risk x becomes larger.

Additionally, in the second exemplary embodiment, the calculation method determines the degree of risk x in consideration of whether the information processing apparatus 100 is in see-through mode which enables the user to view the user's surroundings through the information processing apparatus 100. Specifically, in the second exemplary embodiment, if the information processing apparatus 100 is in the see-through mode, since the user wearing the information processing apparatus 100 is able to view the surroundings, the calculation method determines that the degree of risk remains unchanged from when the information processing apparatus 100 is not worn, and sets the degree of risk x as $x=0$.

Moreover, in a case where there is a plurality of (n) persons adjacent to the user, the calculation method calculates degrees of risk x1 to xn for the respective adjacent persons with use of the values of the distances $\alpha 1$ to $\alpha n$ between the virtual boundary line and the respective adjacent persons. Furthermore, the calculation method for the degree of risk x described here is merely an example, and the definition and calculation formula for the degree of risk x can be replaced with different ones.

Next, a warning method for the user and the adjacent person in the second exemplary embodiment is described. In the second exemplary embodiment, the warning method sets a first threshold value t1 and a second threshold value t2 (t2>t1), which are two-staged threshold values, with respect to a degree of risk calculated based on a distance between a virtual boundary line representing a moving range of a user wearing the information processing apparatus 100 and a person adjacent to the user.

In the second exemplary embodiment, in a case where the degree of risk is less than the first threshold value t1, the warning method determines that the degree of risk for collision between the user and the adjacent person is low and, thus, the user and the adjacent person are under safe conditions. Then, in this case, to inform the adjacent person of such safe conditions, the warning method causes an LED mounted on the input apparatus 200 (controller) to emit blue light.

Moreover, in the second exemplary embodiment, in a case where the degree of risk is greater than or equal to the first threshold value t1 and less than the second threshold value t2, the warning method determines that the degree of risk for collision between the user and the adjacent person is medium and, thus, a condition requiring caution (warning) is occurring. Then, in this case, to inform the adjacent person of the requirement of caution, the warning method causes the LED mounted on the input apparatus 200 (controller) to emit yellow light, thus giving a warning to the adjacent person.

Moreover, in the second exemplary embodiment, in a case where the degree of risk is greater than or equal to the second threshold value t2, the warning method determines that the degree of risk for collision between the user and the adjacent person is high and, thus, a dangerous condition is occurring. Then, in this case, to inform the adjacent person of the dangerous condition, the warning method causes the LED mounted on the input apparatus 200 (controller) to emit red light, thus giving a warning to the adjacent person. Additionally, the warning method causes a loudspeaker mounted on the exterior of the head-mounted display, which is applied as the information processing apparatus 100, to generate warning sound, thus giving a warning to the adjacent person and the user. Besides, the warning method displays, in the head-mounted display, which is applied as the information processing apparatus 100, a warning indicating that there is a possibility of colliding with the adjacent person, thus giving a warning to the user.

Moreover, in a case where there is a plurality of persons adjacent to the user, for example, the warning method gives a warning to an adjacent person with the highest degree of risk x in the plurality of adjacent persons. Furthermore, the warning method for the user and the adjacent person described here is merely an example, and different other warning methods can also be employed.

FIG. 6 is a sequence diagram illustrating an example of a processing procedure in a control method for the information processing apparatus 100 and the input apparatus 200 according to the second exemplary embodiment. Specifically, FIG. 6 illustrates the flow of processing which the information processing apparatus 100 and the input apparatus 200 perform in a case where, while a user wears a head-mounted display, which is applied as the information processing apparatus 100, a person adjacent to the user has come close to the user. Furthermore, in FIG. 6, processing steps similar to the processing steps illustrated in FIG. 2 are assigned the respective same step numbers as those illustrated in FIG. 2, and the detailed description thereof is omitted.

When the processing illustrated in the sequence diagram of FIG. 6 is started and, in step S201, the user wears the information processing apparatus 100 in such a manner that the information processing apparatus 100 covers the view of the user, the control unit 101 of the information processing apparatus 100 advances the processing to step S601.

In step S601, the control unit 101 of the information processing apparatus 100 sets a moving range of the user wearing the information processing apparatus 100 as a virtual boundary line.

Subsequently, in the information processing apparatus 100, the control unit 101 performs processing operations similar to those in step S202 and step S203 illustrated in FIG. 2, thus performing detection processing for the adjacent person and calculation processing for the degree of risk. Furthermore, in the second exemplary embodiment, as mentioned above, in step S203 illustrated in FIG. 6, the control unit 101 denotes the distance between the virtual boundary line and the adjacent person by α and calculates the degree of risk x as x=1/α.

Next, in step S602, the control unit 101 of the information processing apparatus 100 transmits an instruction for light emission (light emission instruction) to the input apparatus 200 based on the degree of risk calculated in step S203.

Next, in step S603, the control unit 201 of the input apparatus 200 performs light emission processing via the output unit 203, which is built in the input apparatus 200, according to the light emission instruction transmitted from the information processing apparatus 100.

Moreover, in the information processing apparatus 100, the control unit 101 performs processing operations similar to those in step S205 and step S206 illustrated in FIG. 2, thus performing generation of warning sound and warning display depending on the degree of risk calculated in step S203.

Next, the details of processing procedures in control methods for the information processing apparatus 100 and the input apparatus 200 which are performed to implement the sequence diagram illustrated in FIG. 6 are described with reference to FIGS. 7A and 7B and FIG. 8, respectively.

Figure 7A:
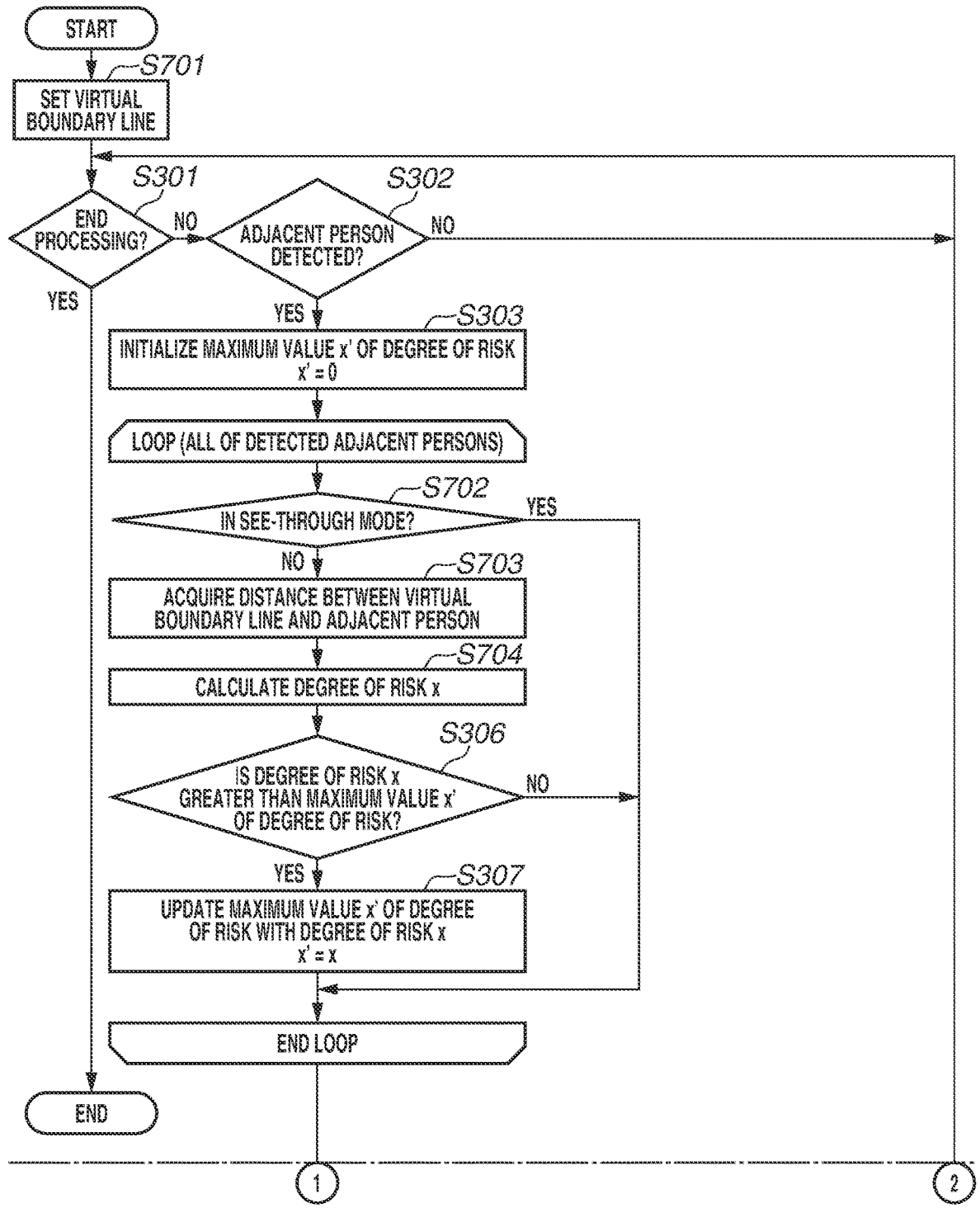
FIGS. 7A and 7B are in combination a flowchart illustrating an example of a processing procedure in a control method for the information processing apparatus according to the second exemplary embodiment.
Figure 7B:
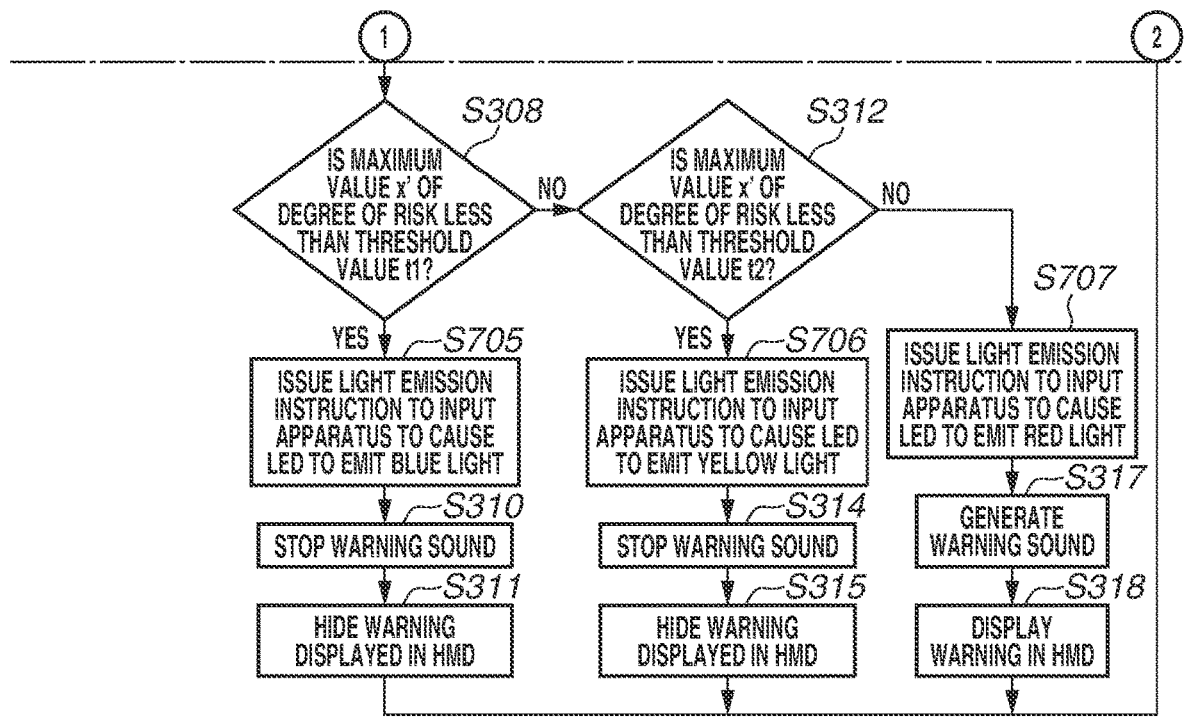

FIGS. 7A and 7B are in combination a flowchart illustrating an example of a processing procedure in a control method for the information processing apparatus 100 according to the second exemplary embodiment. The processing illustrated in the flowchart of FIGS. 7A and 7B is started in response to the user wearing the information processing apparatus 100 in such a manner that the information processing apparatus 100 covers the view of the user and the information processing apparatus 100 being started up. Furthermore, in FIGS. 7A and 7B, processing steps similar to the processing steps illustrated in FIG. 3 are assigned the respective same step numbers as those illustrated in FIG. 3, and the detailed description thereof is omitted.

When the processing illustrated in the flowchart of FIGS. 7A and 7B is started, first, in step S701, the control unit 101 of the information processing apparatus 100 sets a virtual boundary line representing a moving range of the user wearing the information processing apparatus 100. For example, the control unit 101 receives the position and orientation of the information processing apparatus 100 and the states of the buttons via the input unit 104 and the detection unit 106, and sets a virtual boundary line representing a moving range of the user based on these pieces of information. Moreover, for example, the control unit 101 receives the position and orientation of the input apparatus 200 and the states of the buttons via the communication unit 107, and sets a virtual boundary line representing a moving range of the user based on these pieces of information. This processing operation in step S701 is equivalent to the processing operation in step S601 illustrated in FIG. 6.

Subsequently, the control unit 101 performs processing operations similar to those in step S301 to step S303 illustrated in FIG. 3, and then advances the processing to step S702.

In step S702, the control unit 101 determines whether the information processing apparatus 100 is in the see-through mode, which enables the user to view the surroundings of the user while wearing the information processing apparatus 100. Here, the control unit 101 determines whether the information processing apparatus 100 is in the see-through mode, based on the state of the action mode operation button included in the input unit 104 or the state of the action mode operation button included in the input unit 202 of the input apparatus 200.

If, in step S702, it is determined that the information processing apparatus 100 is not in the see-through mode (NO in step S702), the control unit 101 advances the processing to step S703.

In step S703, the control unit 101 acquires a distance between the virtual boundary line set in step S701 and the adjacent person detected in step S302.

Next, in step S704, the control unit 101 calculates, by computation, the value of the degree of risk x based on the distance between the virtual boundary line and the adjacent person acquired in step S703. Subsequently, the control unit 101 performs processing operations similar to those in step S306 and step S307 illustrated in FIG. 3.

Moreover, if, in step S702, it is determined that the information processing apparatus 100 is in the see-through mode (YES in step S702), the control unit 101 advances the processing to the next step.

Here, the above-mentioned processing operations in step S702 to step S704 and step S306 to step S307 are performed with respect to all of the adjacent persons detected in step S302. Thus, the above-mentioned processing operations in step S702 to step S704 and step S306 to step S307 are repeatedly performed by the number of all of the adjacent persons detected in step S302. Moreover, the above-mentioned processing operations in step S303 to step S307 illustrated in FIG. 7A are equivalent to the processing operation in step S203 illustrated in FIG. 6.

When the above-mentioned processing operations in step S702 to step S704 and step S306 to step S307 end, the control unit 101 advances the processing to step S308.

In step S308, the control unit 101 determines whether the maximum value x' of the degree of risk is less than the first threshold value (less than the first threshold value t1).

If, in step S308, it is determined that the maximum value x' of the degree of risk is less than the first threshold value t1 (YES in step S308), the control unit 101 advances the processing to step S705.

In step S705, the control unit 101 transmits, to the input apparatus 200 via the communication unit 107, a light emission instruction for causing the LED to emit blue light. This light emission instruction includes at least color information about the LED to be caused to emit light. Subsequently, the control unit 101 performs processing operations similar to the processing operations in step S310 and step S311 illustrated in FIG. 3, and then returns the processing to step S301.

Moreover, if, in step S308, it is determined that the maximum value x' of the degree of risk is not less than the first threshold value t1 (is greater than or equal to the first threshold value) (NO in step S308), the control unit 101 advances the processing to step S312.

In step S312, the control unit 101 determines whether the maximum value x' of the degree of risk is less than the second threshold value (less than the second threshold value t2), which is greater than the first threshold value t1.

If, in step S312, it is determined that the maximum value x' of the degree of risk is less than the second threshold value t2 (YES in step S312), the control unit 101 advances the processing to step S706. Furthermore, the case where the control unit 101 advances the processing to step S706 occurs in a case where the maximum value x' of the degree of risk is greater than or equal to the first threshold value (greater than or equal to the first threshold value t1) and less than the second threshold value (less than the second threshold value t2).

In step S706, the control unit 101 transmits, to the input apparatus 200 via the communication unit 107, a light emission instruction for causing the LED to emit yellow light. This light emission instruction includes at least color information about the LED to be caused to emit light. Subsequently, the control unit 101 performs processing operations similar to the processing operations in step S314 and step S315 illustrated in FIG. 3, and then returns the processing to step S301.

Moreover, if, in step S312, it is determined that the maximum value x' of the degree of risk is not less than the second threshold value t2 (is greater than or equal to the second threshold value) (NO in step S312), the control unit 101 advances the processing to step S707.

In step S707, the control unit 101 transmits, to the input apparatus 200 via the communication unit 107, a light emission instruction for causing the LED to emit red light. This light emission instruction includes at least color information about the LED to be caused to emit light. Subsequently, the control unit 101 performs processing operations similar to the processing operations in step S317 and step S318 illustrated in FIG. 3, and then returns the processing to step S301.

The processing operations in step S705 to step S707 illustrated in FIG. 7A are equivalent to the processing operation in step S602 illustrated in FIG. 6.

Figure 8:
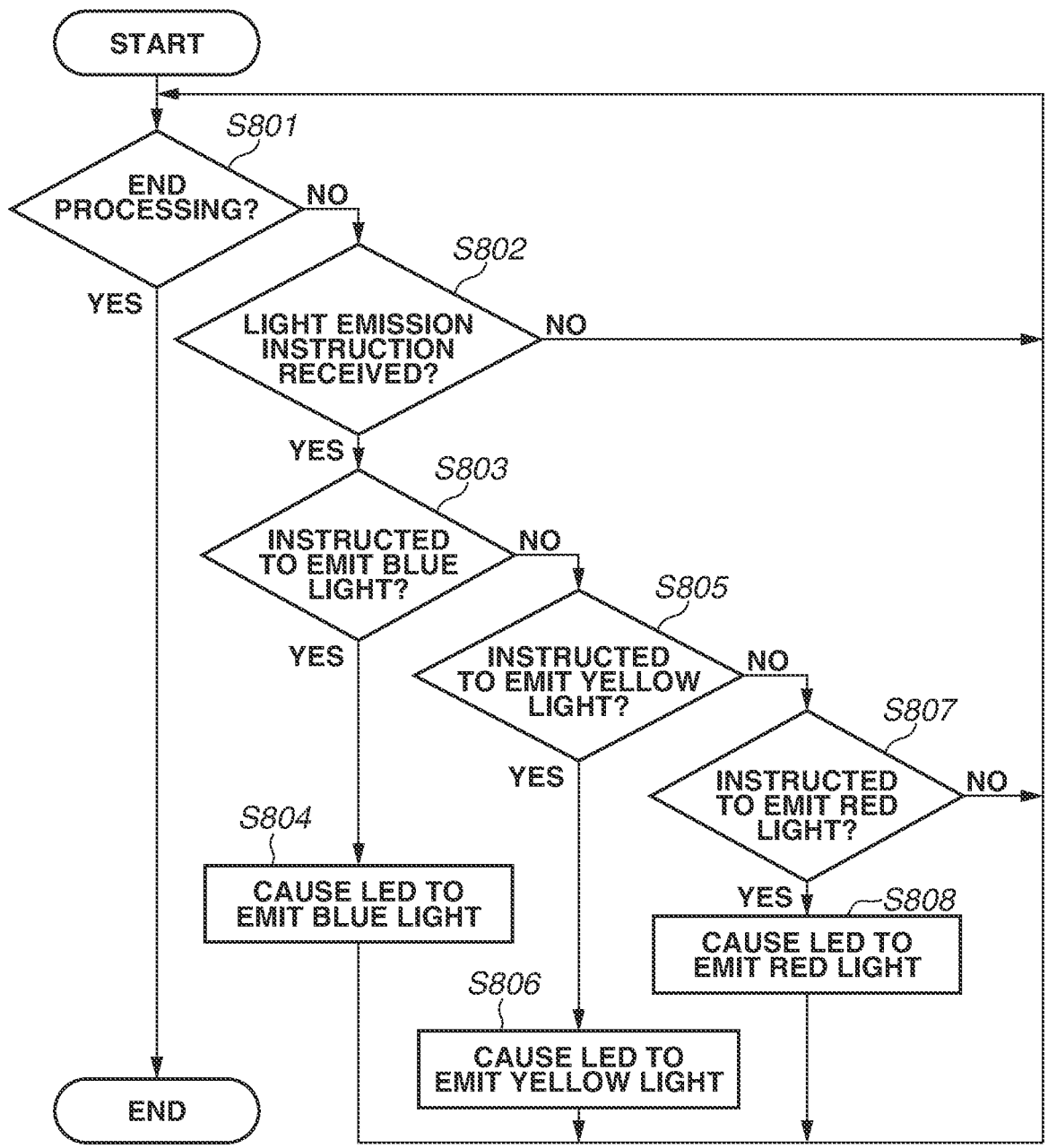
FIG. 8 is a flowchart illustrating an example of a processing procedure in a control method for the input apparatus according to the second exemplary embodiment.

FIG. 8 is a flowchart illustrating an example of a processing procedure in a control method for the input apparatus 200 according to the second exemplary embodiment. The processing illustrated in the flowchart of FIG. 8 is started in response to the input apparatus 200 being started up.

When the processing illustrated in the flowchart of FIG. 8 is started, first, in step S801, the control unit 201 of the input apparatus 200 determines whether to end the processing, based on the states of the respective constituent units of the input apparatus 200. For example, in a case where a stopping operation has been performed via the input unit 202 or in a case where it has been detected via the communication unit 205 that the user has removed the information processing apparatus 100, the control unit 201 determines to end the processing.

If, in step S801, it is determined not to end the processing (it is determined to continue the processing) (NO in step S801), the control unit 101 advances the processing to step S802.

In step S802, the control unit 201 determines whether the light emission instruction has been received from the information processing apparatus 100 via the communication unit 205. If, in step S802, it is determined that the light emission instruction has not been received from the information processing apparatus 100 (NO in step S802), the control unit 201 returns the processing to step S801.

Moreover, if, in step S802, it is determined that the light emission instruction has been received from the information processing apparatus 100 (YES in step S802), the control unit 201 advances the processing to step S803.

In step S803, the control unit 201 determines whether the color information about the LED to be caused to emit light included in the light emission instruction received in step S802 is blue color.

If, in step S803, it is determined that the color information about the LED to be caused to emit light included in the light emission instruction received in step S802 is blue color (YES in step S803), the control unit 201 advances the processing to step S804.

In step S804, the control unit 201 causes the LED included in the output unit 203 to emit blue light. Then, the control unit 201 returns the processing to step S801.

Moreover, if, in step S803, it is determined that the color information about the LED to be caused to emit light included in the light emission instruction received in step S802 is not blue color (NO in step S803), the control unit 201 advances the processing to step S805.

In step S805, the control unit 201 determines whether the color information about the LED to be caused to emit light included in the light emission instruction received in step S802 is yellow color.

If, in step S805, it is determined that the color information about the LED to be caused to emit light included in the light emission instruction received in step S802 is yellow color (YES in step S805), the control unit 201 advances the processing to step S806.

In step S806, the control unit 201 causes the LED included in the output unit 203 to emit yellow light. Then, the control unit 201 returns the processing to step S801.

Moreover, if, in step S805, it is determined that the color information about the LED to be caused to emit light included in the light emission instruction received in step S802 is not yellow color (NO in step S805), the control unit 201 advances the processing to step S807.

In step S807, the control unit 201 determines whether the color information about the LED to be caused to emit light included in the light emission instruction received in step S802 is red color.

If, in step S807, it is determined that the color information about the LED to be caused to emit light included in the light emission instruction received in step S802 is red color (YES in step S807), the control unit 201 advances the processing to step S808.

In step S808, the control unit 201 causes the LED included in the output unit 203 to emit red light. Then, the control unit 201 returns the processing to step S801.

Moreover, if, in step S807, it is determined that the color information about the LED to be caused to emit light included in the light emission instruction received in step S802 is not red color (NO in step S807), the control unit 201 returns the processing to step S801.

Moreover, if, in step S801, it is determined to end the processing (YES in step S801), the control unit 201 ends the processing illustrated in the flowchart of FIG. 8.

Furthermore, the processing operations in step S803 to step S808 illustrated in FIG. 8 are equivalent to the processing operation in step S603 illustrated in FIG. 6.

In the above-described information processing apparatus 100 according to the second exemplary embodiment, the control unit 101 acquires a distance between a virtual boundary line representing a moving range of a user wearing the information processing apparatus 100 in such a manner that the information processing apparatus 100 covers the view of the user and a person adjacent to the user (step S703). Then, the control unit 101 gives a warning to at least the adjacent person based on the acquired distance between the virtual boundary line and the adjacent person (steps S706 and S707 to S318). The control unit 101, which gives this warning, is equivalent to a warning unit. Moreover, the control unit 101 determines whether the user wearing the information processing apparatus 100 is able to view the surroundings of the user (step S702). The control unit 101, which performs this determination, is equivalent to a first determination unit. In this case, the control unit 101 gives a warning to at least the adjacent person based on the acquired distance between the virtual boundary line and the adjacent person and a result of determination as to whether the user wearing the information processing apparatus 100 is able to view the surroundings of the user (steps S706 and S707 to S318).

The control unit 101, which gives this warning, is equivalent to a warning unit.

According to the information processing apparatus 100 in the second exemplary embodiment, since it is possible to give a warning to a person adjacent to a user wearing the information processing apparatus 100 in such a manner that the information processing apparatus 100 covers the view of the user, it is possible to reduce a risk for collision between the user and the adjacent person. Moreover, the control unit 101 gives a warning based on a result of determination as to whether the user is able to view the surroundings of the user, and, therefore, in a case where the user is able to view the surroundings of the user, since the possibility of the user colliding with the adjacent person is low, it is possible to prevent or reduce an unnecessary warning.

Furthermore, the determination as to whether the information processing apparatus 100 is in the see-through mode in step S702 illustrated in FIG. 7A can also be applied to the processing illustrated in the flowchart of FIG. 3 in the first exemplary embodiment. Thus, a configuration which gives a warning based on a result of determination as to whether the user wearing the information processing apparatus 100 is able to view the surroundings of the user can also be applied to the above-described first exemplary embodiment.

Next, a third exemplary embodiment of the present disclosure is described. Furthermore, in the following description of the third exemplary embodiment, items common to those in the above-described first and second exemplary embodiments are omitted from description, and items different from those in the above-described first and second exemplary embodiments are described.

The above-described first and second exemplary embodiments have configurations which measure a distance between the user and the adjacent person and a distance between the virtual boundary line and the adjacent person, respectively, via the detection unit 106 of the information processing apparatus 100.

However, these functions which measure such distances do not necessarily need to be mounted in the information processing apparatus 100, and, for example, a measuring apparatus located near the user can be used to measure such distances. For example, if a camera is arranged near the user as a measuring apparatus and image recognition is performed on a video image captured by the camera, it is possible to detect the information processing apparatus 100 and a person adjacent to the information processing apparatus 100. Additionally, if feature points of the video image are checked against, for example, an LiDAR or a ToF sensor, it is also possible to measure a distance between the information processing apparatus 100 (user) and the adjacent person.

Moreover, the above-described first and second exemplary embodiments have a configuration in which the information processing apparatus 100 or the input apparatus 200, which is a controller for the information processing apparatus 100, gives a warning to the adjacent person. For example, the information processing apparatus 100 can be configured to only issue warning information to the adjacent person via, for example, proximity wireless and to leave a method of warning to a device which has received warning. For example, if a Bluetooth Low Energy (BLE) beacon signal is used to transmit warning information from the information processing apparatus 100, it is possible to give a warning to the adjacent person without knowing what configuration a terminal apparatus receiving the warning information has.

Figure 9:
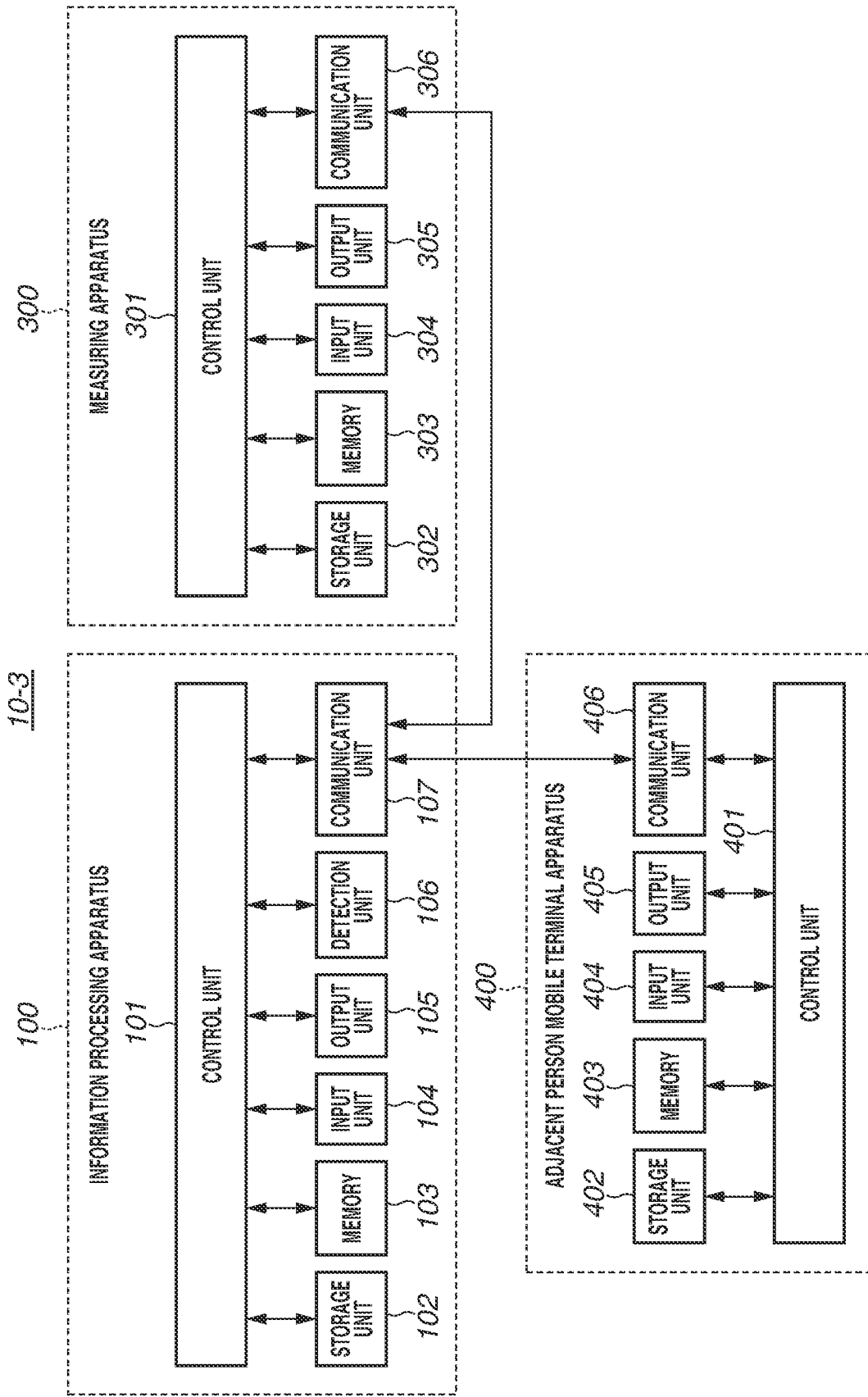
FIG. 9 is a diagram illustrating an example of an outline configuration of an information processing system according to a third exemplary embodiment.

FIG. 9 is a diagram illustrating an example of an outline configuration of an information processing system 10-3 according to the third exemplary embodiment. The information processing system 10-3 includes, as illustrated in FIG. 9, an information processing apparatus 100, a measuring apparatus 300, and an adjacent person mobile terminal apparatus 400. In the description of the third exemplary embodiment, as with the above-described first and second exemplary embodiments, it is supposed that the information processing apparatus 100 is a head-mounted display wearable in such a way as to cover a user's view. Additionally, in the description of the third exemplary embodiment, it is supposed that the measuring apparatus 300 is a camera arranged near the user, and, moreover, it is supposed that the adjacent person mobile terminal apparatus 400 is a smartphone carried by the adjacent person. Furthermore, in FIG. 9, constituent components similar to those illustrated in FIG. 1 and FIG. 4 are assigned the respective same reference characters as those illustrated in FIG. 1 and FIG. 4, and the detailed description thereof is omitted. Thus, the outline configuration of the information processing apparatus 100 according to the third exemplary embodiment illustrated in FIG. 9 is similar to the outline configuration of the information processing apparatus 100 according to each of the first exemplary embodiment illustrated in FIG. 1 and the second exemplary embodiment illustrated in FIG. 4.

The measuring apparatus 300 includes, as illustrated in FIG. 9, a control unit 301, a storage unit 302, a memory 303, an input unit 304, a detection unit 305, and a communication unit 306.

The control unit 301 controls the respective constituent units (302 to 306) of the measuring apparatus 300, thus comprehensively controlling operations of the measuring apparatus 300 and performing various processing operations. Furthermore, instead of the control unit 301 controlling the overall operation of the measuring apparatus 300, a plurality of hardware constituent units can share the processing operations to control the overall operation of the measuring apparatus 300.

The storage unit 302 is, for example, an electrically erasable and recordable non-volatile storage medium, such as a flash memory. The storage unit 302 preliminarily stores, for example, programs which are executed by the control unit 301, databases for various pieces of data, and user setting information. Moreover, the storage unit 302 stores various pieces of information and various pieces of data which have been obtained by control and processing operations performed by the control unit 301.

The memory 303 is, for example, a random access memory (RAM). The memory 303 is used as, for example, a buffer memory which temporarily stores various pieces of information and various pieces of data or a work area for the control unit 301.

The input unit 304 is used to input an instruction issued to the measuring apparatus 300. The input unit 304 includes, for example, a power button used for issuing an instruction for powering on or off the measuring apparatus 300, and an operation button used for issuing an instruction for screen transition.

The detection unit 305 includes, for example, an image capturing sensor for capturing a surrounding video image and sensors such as a light detection and ranging (LiDAR) sensor and a time of flight (ToF) sensor for measuring the surroundings. Additionally, the detection unit 305 includes, for example, an inertial measurement unit (IMU) and a geomagnetic sensor for orientation and position measurement.

The communication unit 306 includes, for example, a network interface card (NIC) into which a connector (RJ45) and a communication integrated circuit (IC) for connection to Ethernet are built. Additionally, the communication unit 306 includes, for example, a communication unit for Wi-Fi or Bluetooth for performing wireless communication with the information processing apparatus 100 or an external apparatus including a controller.

The adjacent person mobile terminal apparatus 400 includes, as illustrated in FIG. 9, a control unit 401, a storage unit 402, a memory 403, an input unit 404, an output unit 405, and a communication unit 406.

The control unit 401 controls the respective constituent units (402 to 406) of the adjacent person mobile terminal apparatus 400, thus comprehensively controlling operations of the adjacent person mobile terminal apparatus 400 and performing various processing operations. Furthermore, instead of the control unit 401 controlling the overall operation of the adjacent person mobile terminal apparatus 400, a plurality of hardware constituent units can share the processing operations to control the overall operation of the adjacent person mobile terminal apparatus 400.

The storage unit 402 is, for example, an electrically erasable and recordable non-volatile storage medium, such as a hard disk drive (HDD), a solid state drive (SSD), or a flash memory. The storage unit 402 preliminarily stores, for example, programs which are executed by the control unit 401, databases for various pieces of data, and user setting information. Moreover, the storage unit 402 stores various pieces of information and various pieces of data which have been obtained by control and processing operations performed by the control unit 401.

The memory 403 is, for example, a random access memory (RAM). The memory 403 is used as, for example, a buffer memory which temporarily stores various pieces of information and various pieces of data or a work area for the control unit 401.

The input unit 404 is used to input an instruction issued to the adjacent person mobile terminal apparatus 400 by the adjacent person. The input unit 404 includes, for example, a power button used for issuing an instruction for powering on or off the adjacent person mobile terminal apparatus 400, and an operation button used for issuing an instruction for screen transition.

The output unit 405 includes, for example, a graphical user interface (GUI) display device used for dialogic operation, a light emission device such as a light-emitting diode (LED), and a sound output device such as a loudspeaker.

The communication unit 406 includes, for example, a communication unit for Wi-Fi or Bluetooth for performing wireless communication with the information processing apparatus 100 or an external apparatus including a controller.

Figure 10:
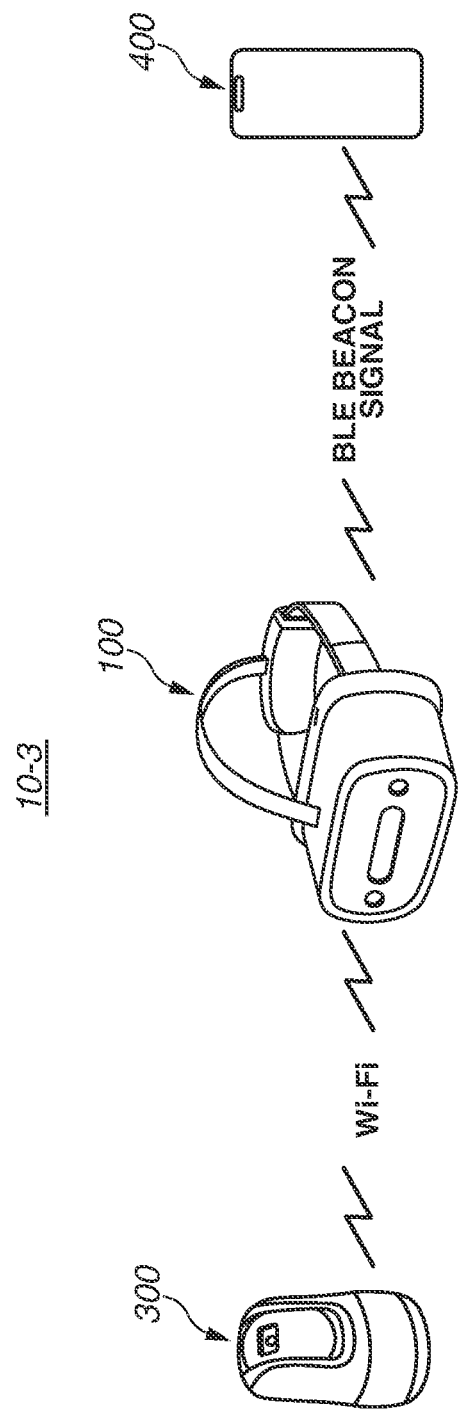
FIG. 10 is a diagram illustrating an example of a communication connection form for an information processing apparatus, a measuring apparatus, and an adjacent person mobile terminal apparatus according to the third exemplary embodiment.

FIG. 10 is a diagram illustrating an example of a communication connection form for the information processing apparatus 100, the measuring apparatus 300, and the adjacent person mobile terminal apparatus 400 according to the third exemplary embodiment. In FIG. 10, constituent components similar to the constituent components illustrated in FIG. 9 are assigned the respective same reference characters as those illustrated in FIG. 9, and the detailed description thereof is omitted.

As illustrated in FIG. 10, the information processing apparatus 100 and the measuring apparatus 300 are connected for communication to each other via proximity wireless such as Wi-Fi. In the third exemplary embodiment, information about a result of detection of an adjacent person detected by the measuring apparatus 300 is transmitted from the measuring apparatus 300 to the information processing apparatus 100 via the communication unit 306 and the communication unit 107. Moreover, as illustrated in FIG. 10, the information processing apparatus 100 and the adjacent person mobile terminal apparatus 400 are connected to each other in such a way as to be able to communicate with each other via proximity wireless such as a BLE beacon signal. In the third exemplary embodiment, warning information issued from the information processing apparatus 100 is transmitted from the information processing apparatus 100 to the adjacent person mobile terminal apparatus 400 via the communication unit 107 and the communication unit 406. Furthermore, the communication connection form illustrated in FIG. 10 is merely an example, and the communication connection method and the communication connection configuration can be replaced with different ones.

The method for calculating a degree of risk in the third exemplary embodiment is similar to the above-described method for calculating a degree of risk in the first exemplary embodiment, and is, therefore, omitted from description. Furthermore, as a method for calculating a degree of risk in the third exemplary embodiment, the above-described method for calculating a degree of risk in the second exemplary embodiment can be applied.

Next, a warning method for the user and the adjacent person in the third exemplary embodiment is described. In the third exemplary embodiment, as with the above-described first exemplary embodiment, the warning method sets a first threshold value t1 and a second threshold value t2 (t2>t1), which are two-staged threshold values, with respect to a degree of risk calculated based on a distance between a user wearing the information processing apparatus 100 and a person adjacent to the user.

In the third exemplary embodiment, in a case where the degree of risk is less than the first threshold value t1, the warning method determines that the degree of risk for collision between the user and the adjacent person is low and, thus, the user and the adjacent person are under safe conditions. Then, in this case, to inform the adjacent person of such safe conditions, the warning method causes an LED mounted on the exterior of the head-mounted display, which is applied as the information processing apparatus 100, to emit blue light.

Moreover, in the third exemplary embodiment, in a case where the degree of risk is greater than or equal to the first threshold value t1 and less than the second threshold value t2, the warning method determines that the degree of risk for collision between the user and the adjacent person is medium and, thus, a condition requiring caution (warning) is occurring. Then, in this case, to inform the adjacent person of the requirement of caution, the warning method causes the LED mounted on the exterior of the head-mounted display, which is applied as the information processing apparatus 100, to emit yellow light, thus giving a warning to the adjacent person. Additionally, the warning method transmits warning information using a BLE beacon signal from the information processing apparatus 100 to the surroundings. Then, the adjacent person mobile terminal apparatus 400, having received the warning information using a BLE beacon signal, gives a warning to an adjacent person carrying the adjacent person mobile terminal apparatus 400 by displaying, on a display screen thereof, information indicating that the adjacent person may collide with the user wearing the information processing apparatus 100.

Moreover, in the third exemplary embodiment, in a case where the degree of risk is greater than or equal to the second threshold value t2, the warning method determines that the degree of risk for collision between the user and the adjacent person is high and, thus, a dangerous condition is occurring. Then, in this case, to inform the adjacent person of the dangerous condition, the warning method causes the LED mounted on the exterior of the head-mounted display, which is applied as the information processing apparatus 100, to emit red light, thus giving a warning to the adjacent person. Additionally, the warning method causes the loudspeaker to generate warning sound, thus giving a warning to the adjacent person and the user. Besides, the warning method displays, in the head-mounted display, which is applied as the information processing apparatus 100, a warning indicating that there is a possibility of colliding with the adjacent person, thus giving a warning to the user.

Moreover, in a case where there is a plurality of persons adjacent to the user, for example, the warning method gives a warning tailored to an adjacent person with the highest degree of risk x in the plurality of adjacent persons. Furthermore, the warning method for the user and the adjacent person described here is merely an example, and different other warning methods can also be employed.

Figure 11:
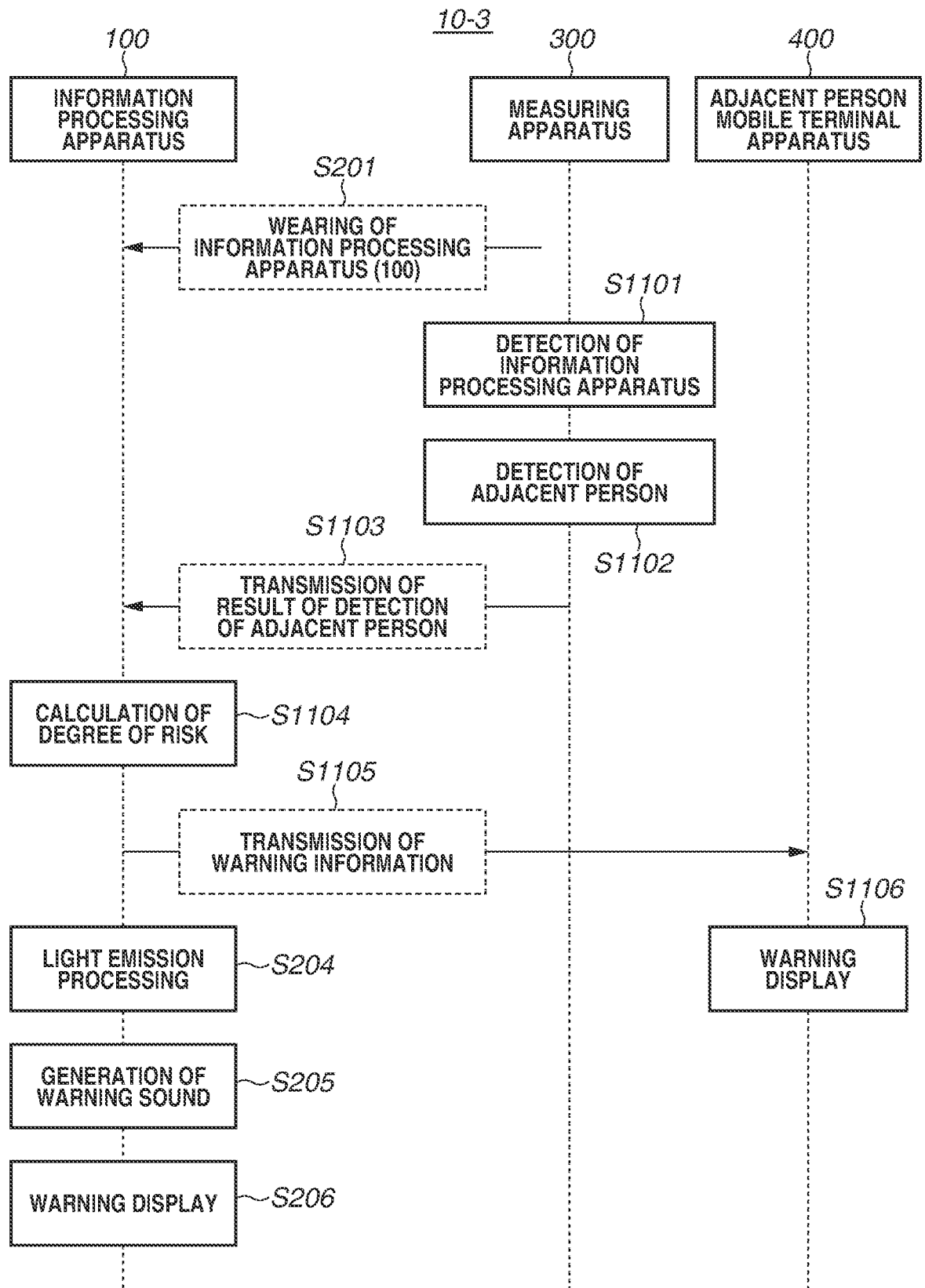
FIG. 11 is a sequence diagram illustrating an example of a processing procedure in a control method for the information processing apparatus, the measuring apparatus, and the adjacent person mobile terminal apparatus according to the third exemplary embodiment.

FIG. 11 is a sequence diagram illustrating an example of a processing procedure in a control method for the information processing apparatus 100, the measuring apparatus 300, and the adjacent person mobile terminal apparatus 400 according to the third exemplary embodiment. Specifically, FIG. 11 illustrates the flow of processing which the information processing apparatus 100, the measuring apparatus 300, and the adjacent person mobile terminal apparatus 400 perform in a case where, while a user wears a head-mounted display, which is applied as the information processing apparatus 100, a person adjacent to the user has come close to the user. Furthermore, in FIG. 11, processing steps similar to the processing steps illustrated in FIG. 2 are assigned the respective same step numbers as those illustrated in FIG. 2, and the detailed description thereof is omitted.

The processing illustrated in the sequence diagram of FIG. 11 is started and, in step S201, the user wears the information processing apparatus 100 in such a manner that the information processing apparatus 100 covers the view of the user. After that, in step S1101, the control unit 301 of the measuring apparatus 300 detects the information processing apparatus 100 via the detection unit 305.

Next, in step S1102, the control unit 301 of the measuring apparatus 300 measures the surroundings of the information processing apparatus 100 (surroundings of the user) via the detection unit 305, thus performing processing for detecting a person adjacent to the user.

Next, in step S1103, the control unit 301 of the measuring apparatus 300 transmits, to the information processing apparatus 100 via the communication unit 306, information about a result of detection of the adjacent person detected in step S1102. The information about a result of detection of the adjacent person to be transmitted includes, for example, at least information about the distance between the user and the adjacent person or the positions thereof, so as to enable calculating a degree of risk to the adjacent person in step S1104 described below. In this step S1103, the control unit 101 of the information processing apparatus 100 acquires, via the communication unit 107, information about a result of detection of the adjacent person transmitted from the measuring apparatus 300.

Next, in step S1104, the control unit 101 of the information processing apparatus 100 calculates, by computation, a degree of risk to the adjacent person based on the information about a result of detection of the adjacent person acquired in step S1103. Here, in the third exemplary embodiment, the control unit 101 denotes the distance between the user and the adjacent person by $\alpha$ and calculates the degree of risk x as $x=1/\alpha$.

Next, in step S1105, the control unit 101 of the information processing apparatus 100 transmits warning information to the adjacent person mobile terminal apparatus 400 via the communication unit 107 according to the degree of risk calculated in step S1104. In this step S1105, the adjacent person mobile terminal apparatus 400 acquires, via the communication unit 406, the warning information transmitted from the information processing apparatus 100.

Next, in step S1106, the control unit 401 of the adjacent person mobile terminal apparatus 400 performs warning display via the output unit 405 based on the warning information acquired in step S1105.

Moreover, in the information processing apparatus 100, the control unit 101 performs processing operations similar to those in step S204 to step S206 illustrated in FIG. 2, thus performing color light emission processing, generation of warning sound, and warning display depending on the degree of risk calculated in step S203.

Next, the details of processing procedures in control methods for the information processing apparatus 100, the measuring apparatus 300, and the adjacent person mobile terminal apparatus 400 which are performed to implement the sequence diagram illustrated in FIG. 11 are described with reference to FIG. 12, FIG. 13, and FIG. 14, respectively.

Figure 12:
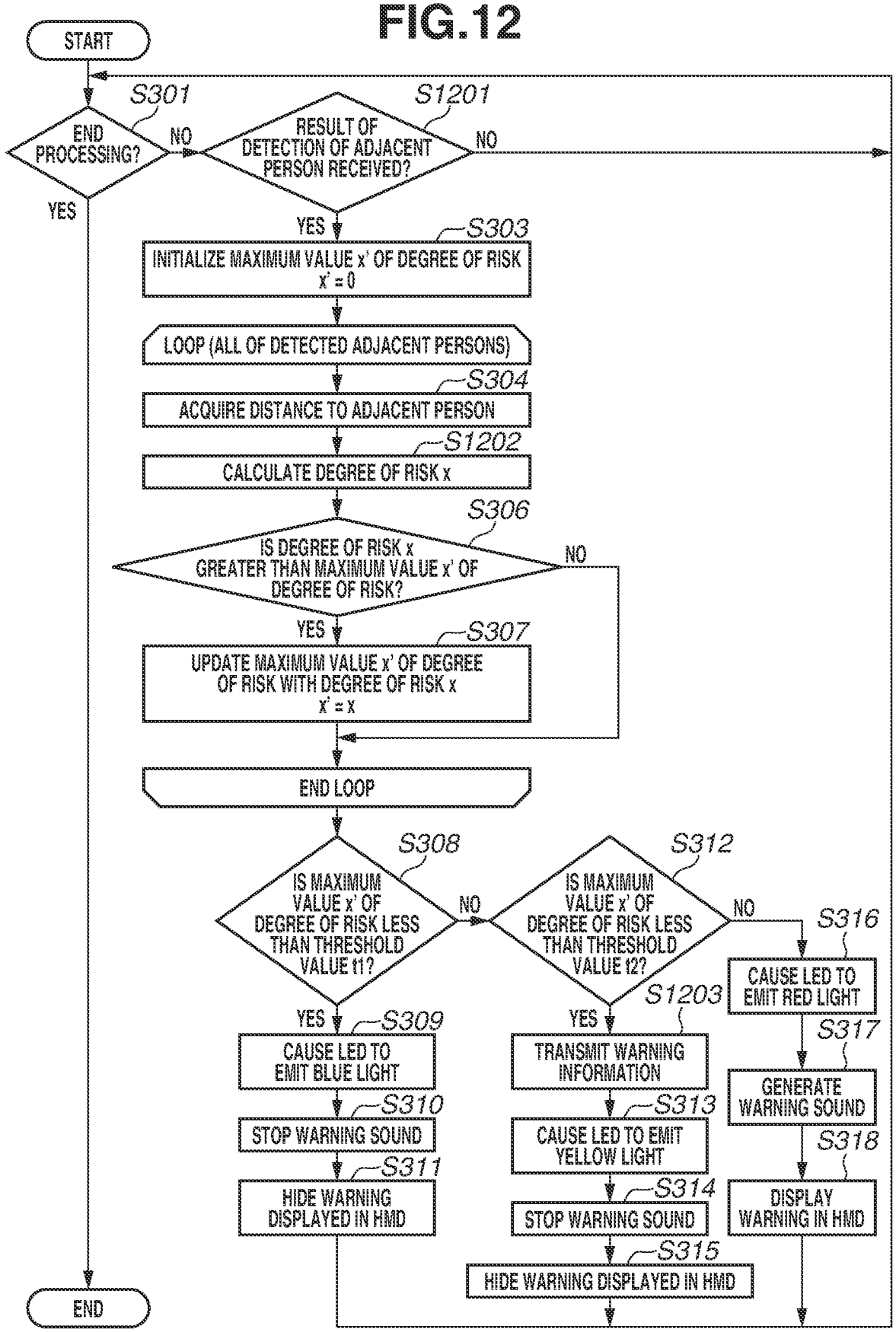
FIG. 12 is a flowchart illustrating an example of a processing procedure in a control method for the information processing apparatus according to the third exemplary embodiment.

FIG. 12 is a flowchart illustrating an example of a processing procedure in a control method for the information processing apparatus 100 according to the third exemplary embodiment. The processing illustrated in the flowchart of FIG. 12 is started in response to the user wearing the information processing apparatus 100 in such a manner that the information processing apparatus 100 covers the view of the user and the information processing apparatus 100 being started up. Furthermore, in FIG. 12, processing steps similar to the processing steps illustrated in FIG. 3 are assigned the respective same step numbers as those illustrated in FIG. 3, and the detailed description thereof is omitted.

When the processing illustrated in the flowchart of FIG. 12 is started, first, in step S301, the control unit 101 of the information processing apparatus 100 determines whether to end the processing, based on the states of the respective constituent units of the information processing apparatus 100.

Then, if, in step S301, it is determined not to end the processing (it is determined to continue the processing) (NO in step S301), the control unit 101 advances the processing to step S1201.

In step S1201, the control unit 101 determines whether information about a result of detection of the adjacent person has been received from the measuring apparatus 300 via the communication unit 107. Furthermore, the processing operation in step S1201 is equivalent to the processing operation in step S1103 illustrated in FIG. 11. If, in step S1201, it is determined that information about a result of detection of the adjacent person has not been received from the measuring apparatus 300 (NO in step S1201), the control unit 101 returns the processing to step S301.

Moreover, if, in step S1201, it is determined that information about a result of detection of the adjacent person has been received from the measuring apparatus 300 (YES in step S1201), the control unit 101 advances the processing to step S303. Subsequently, as with the first exemplary embodiment, in step S303, the control unit 101 performs initialization of the maximum value x' of the degree of risk, and, next, in step S304, the control unit 101 acquires a distance between the user wearing the information processing apparatus 100 (alternatively, the information processing apparatus 100) and the adjacent person. In this case, in step S304, the control unit 101 acquires a distance between the user and the adjacent person included in the information about a result of detection of the adjacent person received in step S1201.

Next, in step S1202, the control unit 101 calculates, by computation, the value of the degree of risk x based on the distance between the user (alternatively, the information processing apparatus 100) and the adjacent person acquired in step S304. This processing operation in step S1202 is equivalent to the processing operation in step S1104 illustrated in FIG. 11.

Subsequently, as with the first exemplary embodiment, the control unit 101 performs processing operations in step S306 to step S307.

Next, in step S308, the control unit 101 determines whether the maximum value x' of the degree of risk is less than the first threshold value (less than the first threshold value t1). If, in step S308, it is determined that the maximum value x' of the degree of risk is less than the first threshold value t1 (YES in step S308), the control unit 101 advances the processing to step S309. Then, subsequently, as with the first exemplary embodiment, the control unit 101 performs processing operations in step S309 to step S311.

Moreover, if, in step S308, it is determined that the maximum value x' of the degree of risk is not less than the first threshold value t1 (is greater than or equal to the first threshold value) (NO in step S308), the control unit 101 advances the processing to step S312.

In step S312, the control unit 101 determines whether the maximum value x' of the degree of risk is less than the second threshold value (less than the second threshold value t2), which is greater than the first threshold value t1.

If, in step S312, it is determined that the maximum value x' of the degree of risk is less than the second threshold value t2 (YES in step S312), the control unit 101 advances the processing to step S1203. Furthermore, the case where the control unit 101 advances the processing to step S1203 occurs in a case where the maximum value x' of the degree of risk is greater than or equal to the first threshold value (greater than or equal to the first threshold value t1) and less than the second threshold value (less than the second threshold value t2).

In step S1203, the control unit 101 transmits warning information using a BLE beacon signal to the surroundings via the communication unit 107. This processing operation in step S1203 is equivalent to the processing operation in step S1105 illustrated in FIG. 11.

After the processing operation in step S1203 ends, as with the first exemplary embodiment, the control unit 101 performs processing operations in step S313 to step S315.

Moreover, if, in step S312, it is determined that the maximum value x' of the degree of risk is not less than the second threshold value t2 (is greater than or equal to the second threshold value) (NO in step S312), the control unit 101 advances the processing to step S316. Then, subsequently, as with the first exemplary embodiment, the control unit 101 performs processing operations in step S316 to step S318.

Figure 13:
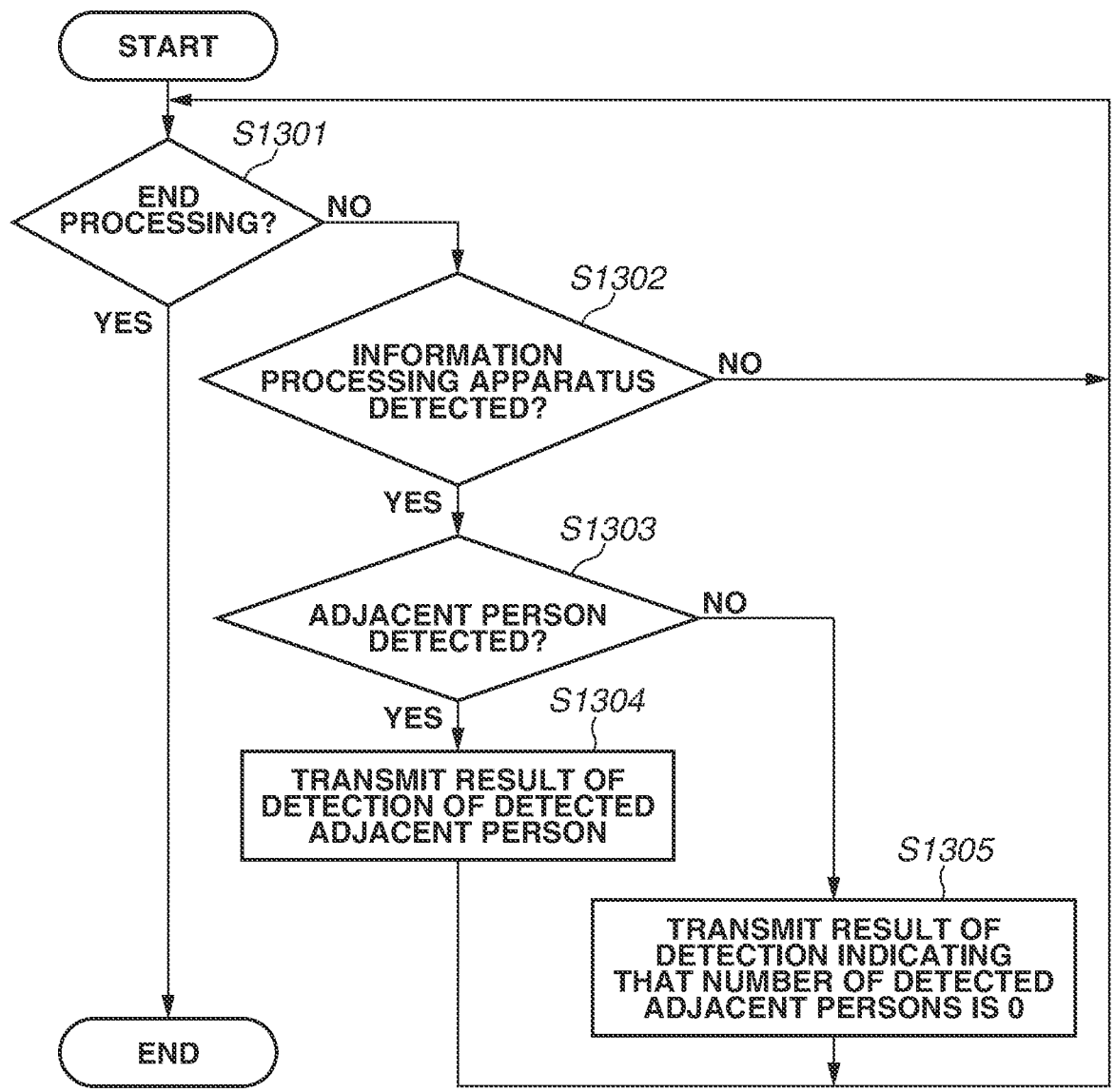
FIG. 13 is a flowchart illustrating an example of a processing procedure in a control method for the measuring apparatus according to the third exemplary embodiment.

FIG. 13 is a flowchart illustrating an example of a processing procedure in a control method for the measuring apparatus 300 according to the third exemplary embodiment. The processing illustrated in the flowchart of FIG. 13 is started in response to, for example, the measuring apparatus 300 being started up.

When the processing illustrated in the flowchart of FIG. 13 is started, first, in step S1301, the control unit 301 of the measuring apparatus 300 determines whether to end the processing, based on the states of the respective constituent units of the measuring apparatus 300. For example, in a case where a stopping operation has been performed via the input unit 304, the control unit 301 determines to end the processing.

If, in step S1301, it is determined not to end the processing (it is determined to continue the processing) (NO in step S1301), the control unit 301 advances the processing to step S1302.

In step S1302, the control unit 301 determines whether the information processing apparatus 100 has been able to be detected via the detection unit 305. This processing operation in step S1302 is equivalent to the processing operation in step S1101 illustrated in FIG. 11. If, in step S1302, it is determined that the information processing apparatus 100 has not been able to be detected (NO in step S1302), the control unit 301 returns the processing to step S1301.

Moreover, if, in step S1302, it is determined that the information processing apparatus 100 has been able to be detected (YES in step S1302), the control unit 301 advances the processing to step S1303.

In step S1303, the control unit 301 determines whether an adjacent person has been able to be detected via the detection unit 305. This processing operation in step S1303 is equivalent to the processing operation in step S1102 illustrated in FIG. 11.

If, in step S1303, it is determined that an adjacent person has been able to be detected (YES in step S1303), the control unit 301 advances the processing to step S1304.

In step S1304, the control unit 301 transmits, to the information processing apparatus 100 via the communication unit 306, information about a result of detection of the adjacent person detected in step S1303.

Moreover, if, in step S1303, it is determined that no adjacent person has been able to be detected (NO in step S1303), the control unit 301 advances the processing to step S1305.

In step S1305, the control unit 301 transmits, to the information processing apparatus 100 via the communication unit 306, information about a result of detection indicating that the number of detected adjacent persons is 0.

The above-mentioned processing operations in step S1304 and step S1305 are equivalent to the processing operation in step S1103 illustrated in FIG. 11. Then, when the processing operation in step S1304 or step S1305 ends, the control unit 301 returns the processing to step S1301.

Moreover, if, in step S1301, it is determined to end the processing (YES in step S1301), the control unit 301 ends the processing illustrated in the flowchart of FIG. 13.

Figure 14:
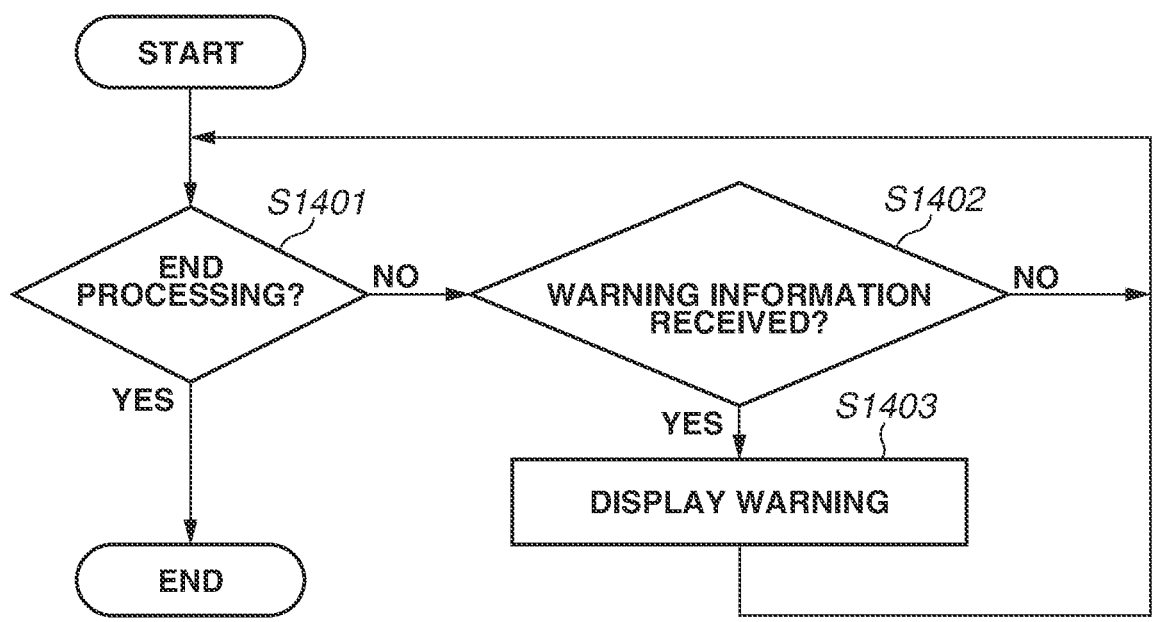
FIG. 14 is a flowchart illustrating an example of a processing procedure in a control method for the adjacent person mobile terminal apparatus according to the third exemplary embodiment.

FIG. 14 is a flowchart illustrating an example of a processing procedure in a control method for the adjacent person mobile terminal apparatus 400 according to the third exemplary embodiment. The processing illustrated in the flowchart of FIG. 14 is started in response to, for example, the adjacent person mobile terminal apparatus 400 being started up.

When the processing illustrated in the flowchart of FIG. 14 is started, first, in step S1401, the control unit 401 of the adjacent person mobile terminal apparatus 400 determines whether to end the processing, based on the states of the respective constituent units of the adjacent person mobile terminal apparatus 400. For example, in a case where a stopping operation has been performed via the input unit 404, the control unit 401 determines to end the processing.

If, in step S1401, it is determined not to end the processing (it is determined to continue the processing) (NO in step S1401), the control unit 401 advances the processing to step S1402.

In step S1402, the control unit 401 determines whether warning information has been received from the information processing apparatus 100 via the communication unit 406. If, in step S1402, it is determined that warning information has not been received from the information processing apparatus 100 (NO in step S1402), the control unit 401 returns the processing to step S1401.

Moreover, if, in step S1402, it is determined that warning information has been received from the information processing apparatus 100 (YES in step S1402), the control unit 401 advances the processing to step S1403.

In step S1403, the control unit 401 displays a warning on a display panel of the adjacent person mobile terminal apparatus 400 via the output unit 405, based on the warning information received in step S1402. Then, the control unit 401 returns the processing to step $1401.

Moreover, if, in step S1401, it is determined to end the processing (YES in step S1401), the control unit 401 ends the processing illustrated in the flowchart of FIG. 14.

Furthermore, the above-mentioned processing operations in step S1402 and step S1403 are equivalent to the processing operation in step S1105 illustrated in FIG. 11.

In the above-described information processing apparatus 100 according to the third exemplary embodiment, the control unit 101 receives information about a result of detection of an adjacent person from the measuring apparatus 300 via the communication unit 107 (steps S1103 and S1201). Then, the control unit 101 calculates, by computation, the value of a degree of risk based on the information about a result of detection of an adjacent person received from the measuring apparatus 300 (steps S1104 and S1202).

Moreover, in a case where the maximum value x' of the degree of risk is greater than or equal to the first threshold value t1 and less than the second threshold value t2, the control unit 101 transmits warning information to the surroundings (steps S1105 and S1203). Accordingly, since, in the adjacent person mobile terminal apparatus 400, when the warning information is received, warning display is performed based on the received warning information (steps S1106 and S1403), it is possible to give a warning to an adjacent person carrying the adjacent person mobile terminal apparatus 400.

According to the third exemplary embodiment, even if the information processing apparatus 100 does not have the function of detecting an adjacent person, it is possible to give a warning to a person adjacent to the user wearing the information processing apparatus 100. Moreover, since the information processing apparatus 100 transmits warning information to the surroundings via, for example, proximity wireless communication, it is possible to give a warning to the adjacent person without knowing what configuration a terminal apparatus receiving the warning information has.

Next, a fourth exemplary embodiment of the present disclosure is described. Furthermore, in the following description of the fourth exemplary embodiment, items common to those in the above-described first to third exemplary embodiments are omitted from description, and items different from those in the above-described first to third exemplary embodiments are described.

The above-described first and second exemplary embodiments have a configuration which gives a warning by causing the LED to emit yellow light in a case where it is determined that the degree of risk is medium (the maximum value x' of the degree of risk is greater than or equal to the first threshold value t1 and less than the second threshold value t2) and, thus, a condition requiring caution is occurring. In this respect, in a case where the adjacent person is unaware of a warning given by causing the LED to emit yellow light, it is considered that a warning using light alone is not enough. Therefore, in the fourth exemplary embodiment, for example, a configuration which, in a case where it is determined that, after a warning using light is given, the adjacent person is unaware of warning light, also gives a warning using generation of warning sound is employed. According to this configuration, it is possible to cause the adjacent person to become aware of the issuance of a warning and, thus, it is possible to reduce the possibility of the user and the adjacent person colliding with each other. Moreover, the determination as to whether the adjacent person is aware of warning light can be performed by, for example, performing image recognition on a video image captured by a camera mounted on the information processing apparatus 100.

The method for calculating a degree of risk in the fourth exemplary embodiment is similar to the above-described method for calculating a degree of risk in the first exemplary embodiment, and is, therefore, omitted from description. Furthermore, as a method for calculating a degree of risk in the fourth exemplary embodiment, the above-described method for calculating a degree of risk in the second exemplary embodiment can be applied.

Next, a warning method for the user and the adjacent person in the fourth exemplary embodiment is described. In the fourth exemplary embodiment, as with the above-described first exemplary embodiment, the warning method sets a first threshold value t1 and a second threshold value t2 (t2>t1), which are two-staged threshold values, with respect to a degree of risk calculated based on a distance between a user wearing the information processing apparatus 100 and a person adjacent to the user.

In the fourth exemplary embodiment, in a case where the degree of risk is less than the first threshold value t1, the warning method determines that the degree of risk for collision between the user and the adjacent person is low and, thus, the user and the adjacent person are under safe conditions. Then, in this case, to inform the adjacent person of such safe conditions, the warning method causes an LED mounted on the exterior of the head-mounted display, which is applied as the information processing apparatus 100, to emit blue light.

Moreover, in the fourth exemplary embodiment, in a case where the degree of risk is greater than or equal to the first threshold value t1 and less than the second threshold value t2, the warning method determines that the degree of risk for collision between the user and the adjacent person is medium and, thus, a condition requiring caution (warning) is occurring. Then, in this case, to inform the adjacent person of the requirement of caution, the warning method causes the LED mounted on the exterior of the head-mounted display, which is applied as the information processing apparatus 100, to emit yellow light, thus giving a warning to the adjacent person. Additionally, in a case where it is determined that the adjacent person is not ware of warning light, the warning method causes warning sound to be generated from a loudspeaker mounted on the head-mounted display, which is applied as the information processing apparatus 100. Then, in a case where it is determined that the adjacent person has become aware of warning sound, the warning method stops warning sound being generated from the loudspeaker.

Moreover, in the fourth exemplary embodiment, in a case where the degree of risk is greater than or equal to the second threshold value t2, the warning method determines that the degree of risk for collision between the user and the adjacent person is high and, thus, a dangerous condition is occurring. Then, in this case, to inform the adjacent person of the dangerous condition, the warning method causes the LED mounted on the exterior of the head-mounted display, which is applied as the information processing apparatus 100, to emit red light, thus giving a warning to the adjacent person. Additionally, the warning method causes the loudspeaker to generate warning sound, thus giving a warning to the adjacent person and the user. Besides, the warning method displays, in the head-mounted display, which is applied as the information processing apparatus 100, a warning indicating that there is a possibility of colliding with the adjacent person, thus giving a warning to the user.

Moreover, in a case where there is a plurality of persons adjacent to the user, for example, the warning method gives a warning tailored to an adjacent person with the highest degree of risk x in the plurality of adjacent persons. Furthermore, the warning method for the user and the adjacent person described here is merely an example, and different other warning methods can also be employed.

Figure 15A:
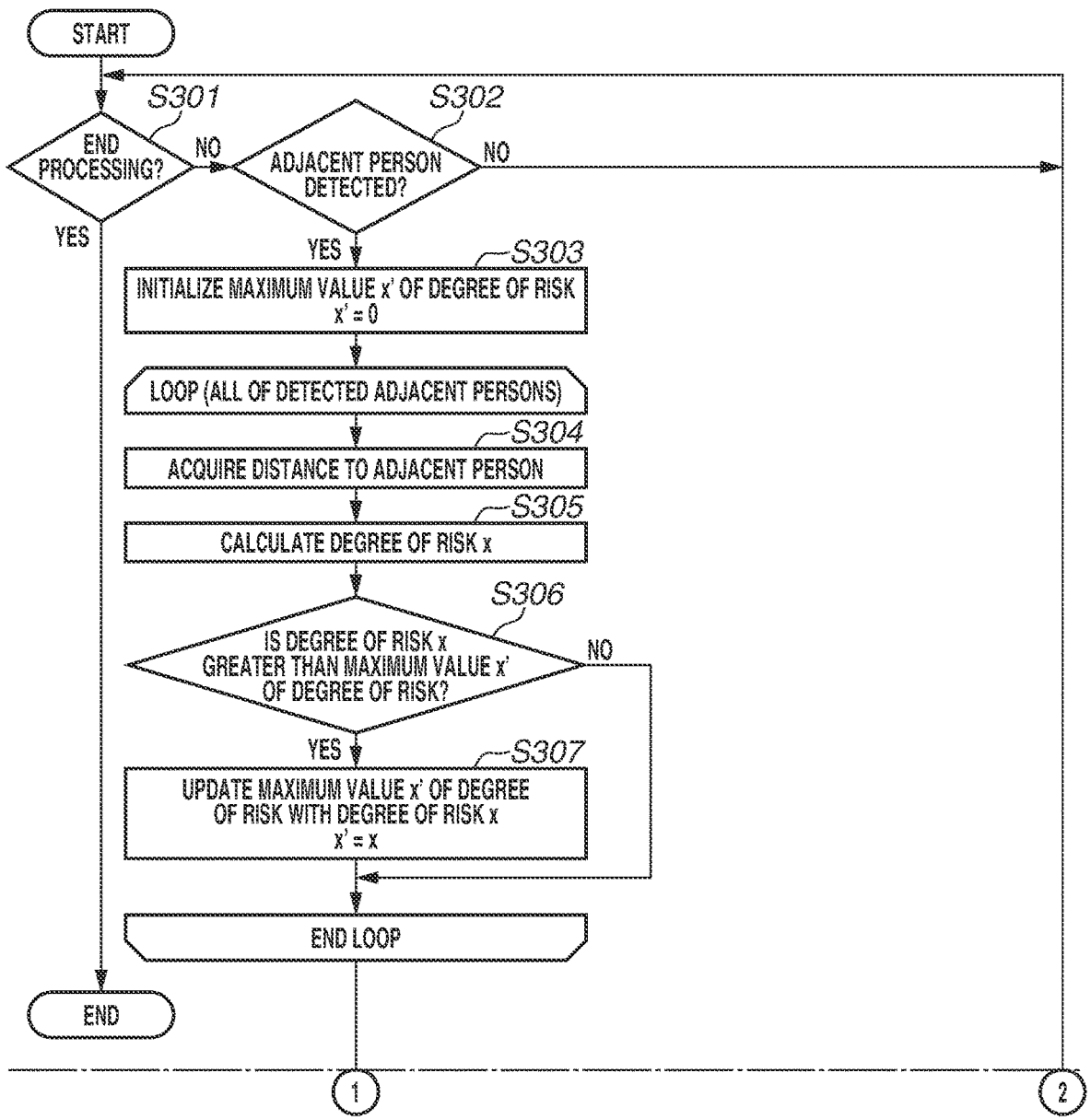
FIGS. 15A and 15B are in combination a flowchart illustrating an example of a processing procedure in a control method for an information processing apparatus according to a fourth exemplary embodiment.
Figure 15B:
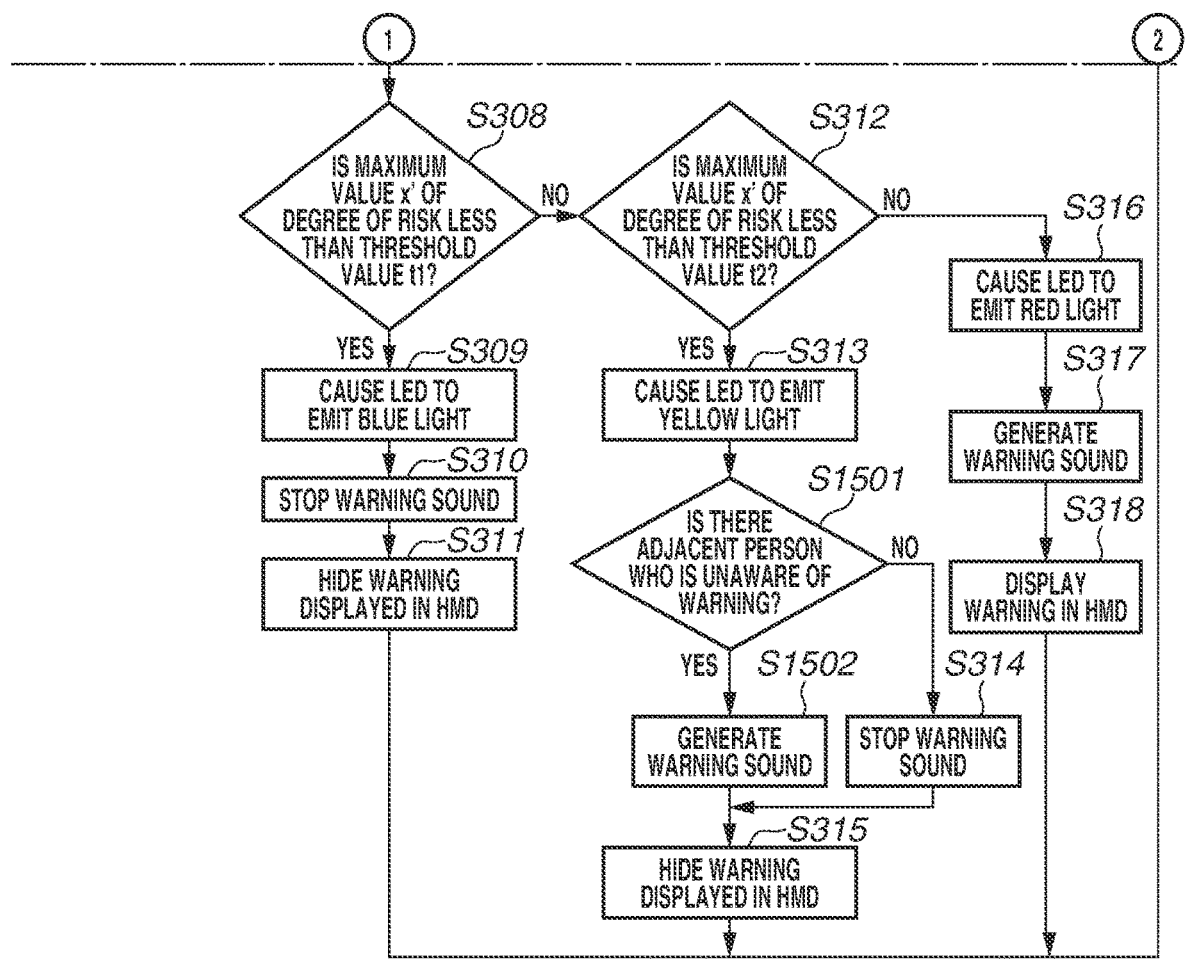

FIGS. 15A and 15B are in combination a flowchart illustrating an example of a processing procedure in a control method for the information processing apparatus 100 according to the fourth exemplary embodiment. The processing illustrated in the flowchart of FIGS. 15A and 15B is started in response to the user wearing the information processing apparatus 100 in such a manner that the information processing apparatus 100 covers the view of the user and the information processing apparatus 100 being started up. Furthermore, in FIGS. 15A and 15B, processing steps similar to the processing steps illustrated in FIG. 3 are assigned the respective same step numbers as those illustrated in FIG. 3, and the detailed description thereof is omitted.

When the processing illustrated in the flowchart of FIGS. 15A and 15B is started, first, as with the first exemplary embodiment illustrated in FIG. 3, the control unit 101 performs processing operations in step S301 to step S313. Specifically, in step S313, in a case where the maximum value x' of the degree of risk is greater than or equal to the first threshold value t1 and less than the second threshold value t2, the control unit 101 causes the LED mounted on the information processing apparatus 100 to emit yellow light, thus giving a warning to the adjacent person.

When the processing operation in step S313 ends, subsequently, in step S1501, the control unit 101 of the information processing apparatus 100 determines, via the detection unit 106, whether there is an adjacent person who is unaware of a warning.

If, in step S1501, it is determined that there is an adjacent person who is unaware of a warning (YES in step S1501), the control unit 101 advances the processing to step S1502.

In step S1502, the control unit 101 causes warning sound to be generated from the loudspeaker mounted on the information processing apparatus 100 via the output unit 105. This processing operation in step S1502 is equivalent to the processing operation in step S205 illustrated in FIG. 2.

Moreover, if, in step S1501, it is determined that there is no adjacent person who is unaware of a warning (NO in step S1501), the control unit 101 advances the processing to step S314.

In step S314, in a case where warning sound is being generated from the loudspeaker mounted on the information processing apparatus 100 via the output unit 105, the control unit 101 stops the warning sound. Moreover, in a case where warning sound is not being generated from the loudspeaker, the control unit 101 performs processing for maintaining this condition.

In a case where the processing operation in step S1502 has ended or in a case where the processing operation in step S314 has ended, the control unit 101 advances the processing to step S315, and then performs a processing operation similar to that in the first exemplary embodiment illustrated in FIG. 3.

The information processing apparatus 100 according to the above-described fourth exemplary embodiment performs the following processing operations.

In a case where the degree of risk is greater than or equal to the first threshold value t1 and less than the second threshold value t2, the control unit 101 determines whether the adjacent person is aware of yellow light emission (step S1501). The control unit 101, which performs this determination, is equivalent to a second determination unit. Then, in a case where it is determined that the adjacent person is unaware of yellow light emission, the control unit 101 gives a warning using generation of warning sound (step S1502).

According to the information processing apparatus 100 in the fourth exemplary embodiment, in a case where it can be determined that the adjacent person is unaware of a warning, a warning using generation of warning sound is given, so that it is possible to cause the adjacent person to become aware of a warning being given to the adjacent person. Accordingly, it is possible to reduce the possibility of the user and the adjacent person colliding with each other.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation in such a way as to encompass all such modifications and equivalent structures and functions.

This application claims the benefit of Japanese Patent Application No. 2023-063537 filed Apr. 10, 2023, which is hereby incorporated by reference herein in its entirety.

What is claimed is:

1. A wearable apparatus that cover a user's view, the wearable apparatus comprising:
   a processor and a memory for storing instructions that, when executed by the processor, cause the processor to function as:
   an acquisition unit configured to acquire a result obtained by detecting a person adjacent to the user;
   a control unit configured to
   calculate a value of a degree of risk based on a distance between the user and the person adjacent to the user,
   determine whether the calculated value of the degree of risk is greater than a maximum value of the degree of risk, and
   update the maximum value of the degree of risk with the calculated value of the degree of risk;
   a warning unit configured to provide a warning to at least the adjacent person based on a distance between a virtual boundary line representing a moving range of the user wearing the wearable apparatus and the adjacent person, and
   a first determination unit configured to determine whether the adjacent person is aware of the warning,
   wherein the warning unit is further configured to
   in a case where the calculated value of the degree of risk which becomes larger as the distance becomes smaller is greater than or equal to a first predetermined threshold value, provide the warning to the adjacent person by using light, and
   in a case where the calculated value of the degree of risk is greater than or equal to a second predetermined threshold value that is greater than the first predetermined threshold value, the first determination unit further determines that the adjacent person is unaware of the warning using the light, provide the warning to the adjacent person and the user by using sound.

2. The apparatus according to claim 1,
   wherein execution of the stored instructions further configures the processor to functions as a second determination unit configured to determine whether the user is able to view surroundings of the user, and
   wherein the warning unit gives the warning based on the distance and a determined result of the second determination unit.

3. The apparatus according to claim 1, further comprising a light emission device.

4. The apparatus according to claim 3, wherein execution of the stored instructions further configures the processor to function as a light emission control unit configured to cause different color light to be emitted by the light emission device to the adjacent person in accordance with the degree of risk.

5. A control method for a wearable apparatus that covers a user's view, the control method comprising:
   acquiring a result obtained by detecting a person adjacent to the user;
   calculating a value of a degree of risk based on a distance between the user and the person adjacent to the user;
   determining whether the calculated value of the degree of risk is greater than a maximum value of the degree of risk;
   updating the maximum value of the degree of risk with the calculated value of the degree of risk;
   providing a warning to at least the adjacent person based on a distance between a virtual boundary line representing a moving range of the user wearing the wearable apparatus and the adjacent person; and
   determining whether the adjacent person is aware of the warning, wherein the warning,
   in a case where the calculated value of the degree of risk which becomes larger as the distance becomes smaller is greater than or equal to a first predetermined threshold value, provides the warning to the adjacent person by using light, and
   in a case where the calculated value of the degree of risk is greater than or equal to a second predetermined threshold value that is greater than the first predetermined threshold value, the determining further determines that the adjacent person is unaware of the warning using the light, provides the warning to the adjacent person and the user by using sound.

6. The control method according to claim 5, further comprising:
   second determining whether the user is able to view surroundings of the user,
   wherein the warning is based on the distance and a determined result of the second determining.

7. The control method according to claim 5, further comprising causing different color light to be emitted by a light emission device to the adjacent person in accordance with the degree of risk.

8. A non-transitory computer-readable storage medium storing instructions that, when executed by a processor, configures the processor to execute a control method for a wearable apparatus that covers a user's view, the control method comprising:
   acquiring a result obtained by detecting a person adjacent to the user;
   calculating a value of a degree of risk based on a distance between the user and the person adjacent to the user;
   determining whether the calculated value of the degree of risk is greater than a maximum value of the degree of risk;
   updating the maximum value of the degree of risk with the calculated value of the degree of risk;
   providing a warning to at least the adjacent person based on a distance between a virtual boundary line representing a moving range of the user wearing the apparatus and the adjacent person; and
   first determining whether the adjacent person is aware of the warning, wherein the warning,
   in a case where the calculated value of the degree of risk which becomes larger as the distance becomes smaller is greater than or equal to a first predetermined threshold value, provides the warning to the adjacent person by using light, and in a case where the calculated value of the degree of risk is greater than or equal to a second predetermined threshold value that is greater than the first predetermined threshold value, the determining further determines that the adjacent person is unaware of the warning using the light, provides the warning to the adjacent person and the user by using sound.

9. The non-transitory computer-readable storage medium according to claim 8, further comprising:

second determining whether the user is able to view surroundings of the user, wherein the warning is based on the distance and a determined result of the second determining.

10. The non-transitory computer-readable storage medium according to claim 8, further comprising causing different color light to be emitted by a light emission device to the adjacent person in accordance with the degree of risk.

* * * * *